(12) United States Patent
Koga

(10) Patent No.: US 11,063,487 B2
(45) Date of Patent: Jul. 13, 2021

(54) STATOR

(71) Applicant: AISIN AW CO., LTD., Anjo (JP)

(72) Inventor: Kiyotaka Koga, Nishio (JP)

(73) Assignee: AISIN AW CO., LTD., Anjo (JP)

(*) Notice: Subject to any disclaimer, the term of this patent is extended or adjusted under 35 U.S.C. 154(b) by 209 days.

(21) Appl. No.: 16/473,501

(22) PCT Filed: Mar. 16, 2018

(86) PCT No.: PCT/JP2018/010651
§ 371 (c)(1),
(2) Date: Jun. 25, 2019

(87) PCT Pub. No.: WO2018/169089
PCT Pub. Date: Sep. 20, 2018

(65) Prior Publication Data
US 2020/0006994 A1    Jan. 2, 2020

(30) Foreign Application Priority Data

Mar. 16, 2017  (JP) .............................. JP2017-051065
Sep. 15, 2017  (JP) .............................. JP2017-178159

(51) Int. Cl.
*H02K 3/12*     (2006.01)
*H02K 3/28*     (2006.01)

(52) U.S. Cl.
CPC ................. *H02K 3/28* (2013.01); *H02K 3/12* (2013.01)

(58) Field of Classification Search
CPC ........ H02K 3/12; H02K 3/28; H02K 2203/06; H02K 2203/09
See application file for complete search history.

(56) References Cited

U.S. PATENT DOCUMENTS

| | | | | |
|---|---|---|---|---|
| 2,407,935 A | * | 9/1946 | Perfetti ................... | H02K 3/12 310/201 |
| 8,030,812 B2 | * | 10/2011 | Tanaka ..................... | H02K 3/28 310/71 |
| 8,390,159 B2 | * | 3/2013 | Koike ...................... | H02K 3/50 310/71 |
| 8,659,201 B2 | * | 2/2014 | Utaka ...................... | H02K 3/12 310/201 |
| 8,674,577 B2 | * | 3/2014 | Utaka ...................... | H02K 3/12 310/201 |
| 2009/0200888 A1 | | 8/2009 | Tanaka et al. | |
| 2014/0300237 A1 | | 10/2014 | Tokizawa | |

(Continued)

FOREIGN PATENT DOCUMENTS

| JP | S56-71456 A | 6/1981 |
|---|---|---|
| JP | 2009-219343 A | 9/2009 |
| JP | 2013-5541 A | 1/2013 |

(Continued)

OTHER PUBLICATIONS

May 29, 2018 Search Report issued in International Patent Application No. PCT/JP2018/010651.

*Primary Examiner* — Dang D Le
(74) *Attorney, Agent, or Firm* — Oliff PLC

(57) ABSTRACT

A stator that includes a stator core having a plurality of slots; a first coil that is disposed in a first slot of the plurality of slots; and a second coil that is disposed in a second slot of the plurality of slots that is different from the first slot in which the first coil is disposed.

18 Claims, 10 Drawing Sheets

(56) References Cited

U.S. PATENT DOCUMENTS

2015/0162793 A1* 6/2015 Hashimoto ............ H02K 3/18
                                                                  310/208
2017/0054340 A1   2/2017 Tanaka et al.

FOREIGN PATENT DOCUMENTS

| JP | 2013-165599 A | 8/2013 |
| JP | 2014-204597 A | 10/2014 |
| WO | 2017/002426 A1 | 1/2017 |

* cited by examiner

STATOR

BACKGROUND

The present disclosure relates to stators.

Stators having coils are conventionally known in the art. Such a stator is described in, e.g., Japanese Patent Application Publication No. 2009-219343 (JP 2009-219343 A).

JP 2009-219343 A discloses a stator that includes a stator core having a plurality of slots, and a plurality of coils disposed in the slots. In this stator, two coils connected together are a first coil having a tip end-side coil terminal extended in the direction toward a coil end (the direction of a rotation axis) at a position on the tip end side (radially inner side) of the slot and a second coil having a bottom-side coil terminal extended in the direction toward the coil end at a position on the bottom side (radially outer side) of the slot and connected to the tip end-side coil terminal of the first coil. The connecting portion (tip end) of the tip end-side coil terminal of the first coil and the connecting portion (tip end) of the bottom-side coil terminal of the second coil are joined together with both of the connecting portions facing radially outward (e.g., FIG. 8).

SUMMARY

However, the stator described in JP 2009-219343 A has the following disadvantage. Since the connecting portion of the tip end-side coil terminal of the first coil and the connecting portion of the bottom-side coil terminal of the second coil are joined together with both of the connecting portions facing radially outward (toward the radially outer side), the joint portion of the connecting portions extends into a region above a radially outer part (back yoke) of the stator core (a region outside the radially outer part of the stator core in the direction of the rotation axis) and occupies the space above the radially outer part of the stator core.

An exemplary aspect of the disclosure provides a stator that occupies little space in a region outside a radially outer part of a stator core in the direction of a rotation axis.

A stator according to one aspect of the present disclosure includes: a stator core having a plurality of slots; a first coil that is disposed in a first slot of the plurality of slots; and a second coil that is disposed in a second slot of the plurality of slots that is different from the first slot in which the first coil is disposed, wherein a tip end of a lead of the first coil faces one side in a circumferential direction at a coil end, a tip end of a lead of the second coil faces the other side in the circumferential direction at the coil end, the tip end of the lead, extending toward the one side in the circumferential direction, of the first coil and the tip end of the lead, extending toward the other side in the circumferential direction, of the second coil are joined together, and the tip end of the lead of the first coil and the tip end of the lead of the second coil are located radially outside a root of the first slot and radially inside a radially outermost part of the stator core as viewed in a direction of a rotation axis.

In the stator according to the one aspect of the present disclosure, as described above, the tip end of the lead, extending toward the one side in the circumferential direction, of the first coil is joined to the tip end of the lead, extending toward the other side in the circumferential direction, of the second coil. The joint of the tip end of the lead portion of the first coil and the tip end of the lead portion of the second coil thus extends in the circumferential direction. The joint can thus be prevented from extending into a region outside a radially outer part (back yoke) of the stator core in the direction of the rotation axis, as compared to the case where the joint extends radially outward. This ensures that little space is occupied in the region outside the radially outer part of the stator core in the direction of the rotation axis.

According to the present disclosure, as described above, a stator can be provided which occupies little space in a region outside a radially outer part of a stator core in the direction of a rotation axis.

DETAILED DESCRIPTION OF EMBODIMENTS

Embodiments of the present disclosure will be described below with reference to the accompanying drawings.

(Stator Structure)

The structure of a stator 100 according to a first embodiment will be described with reference to FIGS. 1 to 12.

The stator 100 is a stator that together with a rotor (not shown) is used for a rotating electrical machine (not shown).

Figure 1:
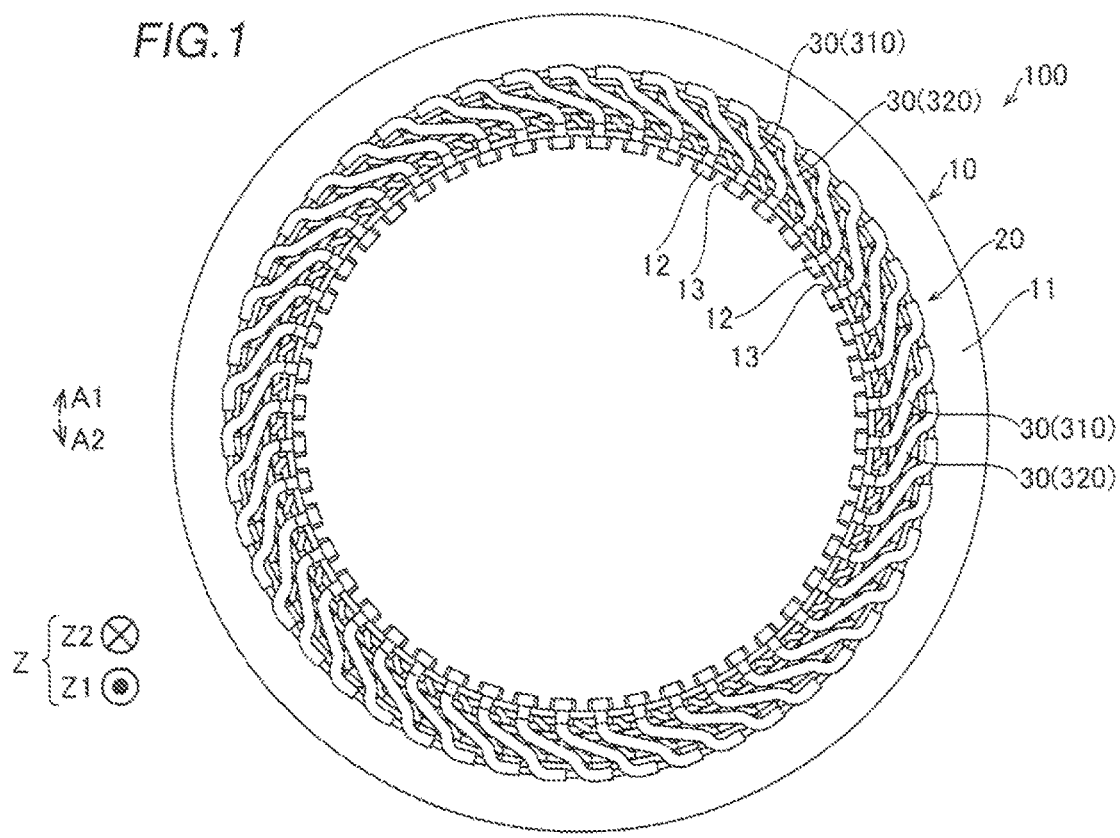
FIG. 1 is a plan view of a stator according to a first embodiment of the present disclosure.
Figure 2:
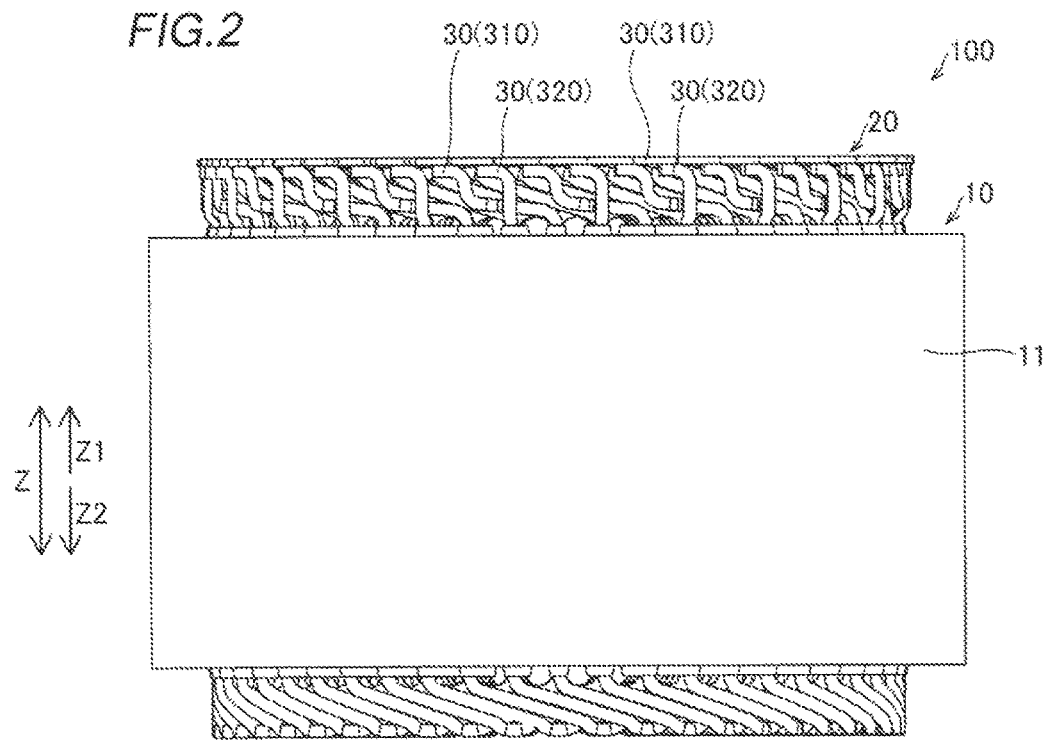
FIG. 2 is a side view of the stator according to the first embodiment of the present disclosure.
Figure 3:
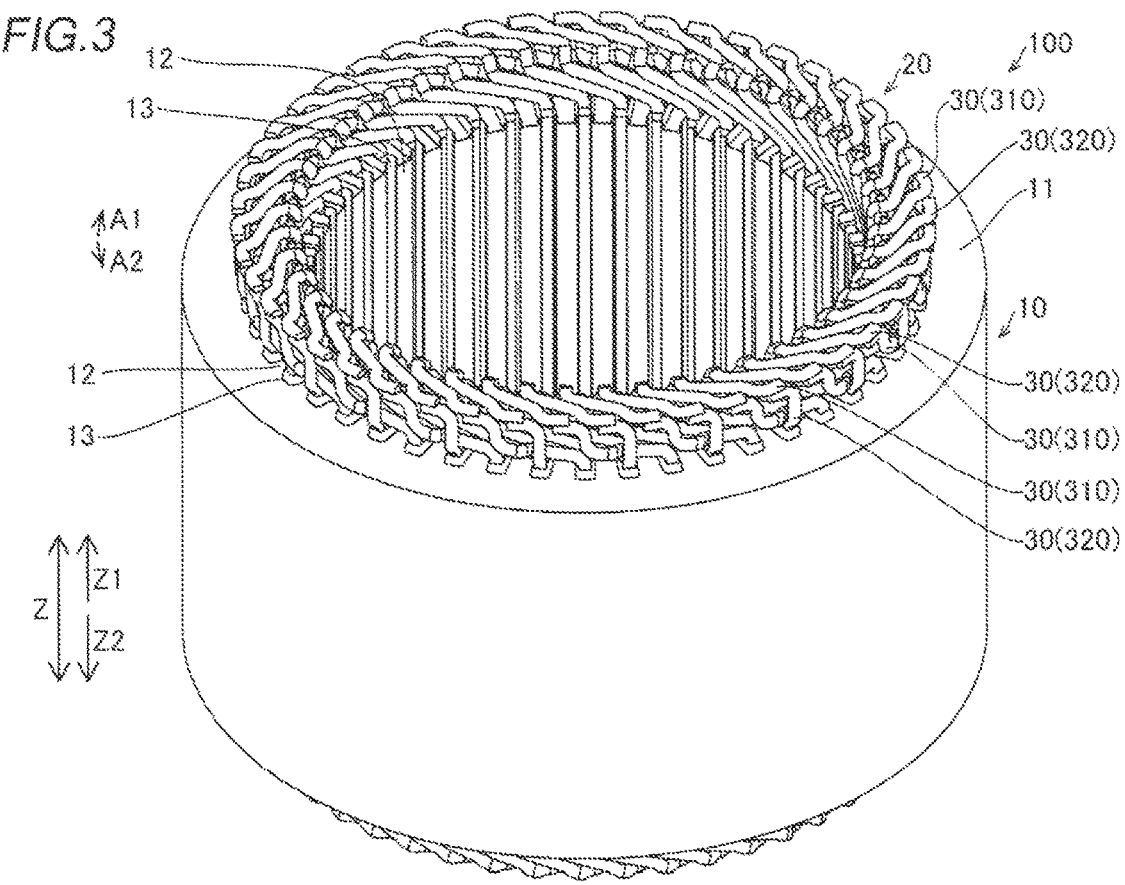
FIG. 3 is a perspective view of the stator according to the first embodiment of the present disclosure.

As shown in FIGS. 1 to 3, the stator 100 includes a stator core 10 and a coil unit 20 wound in the stator core 10.

For example, the stator core 10 is formed by stacking a plurality of electrical steel sheets in the direction of a rotation axis (Z direction). The stator core 10 has a generally annular shape. A space where the rotor is to be disposed is formed radially inside the stator core 10. The stator core 10 includes a back yoke 11 having a generally annular shape and a plurality of teeth 12 extending radially inward from the back yoke 11. The plurality of teeth 12 are formed at substantially regular angular intervals in the circumferential direction. A slot 13 is formed between adjacent ones of the teeth 12. In other words, the stator core 10 has a plurality of slots 13.

The coil unit 20 is comprised of a plurality of coils 30 that are disposed in the plurality of slots 13. The coil unit 20 has a generally annular overall shape. The coils 30 are concentric winding coils. The coil 30 is formed by winding a rectangular wire having a generally rectangular cross section. The coil 30 has a generally hexagonal overall shape. Each coil 30 of the coil unit 20 serves as one of a U-phase coil, a V-phase coil, and a W-phase coil when the stator 100 is applied to a three-phase AC motor.

Figure 4:
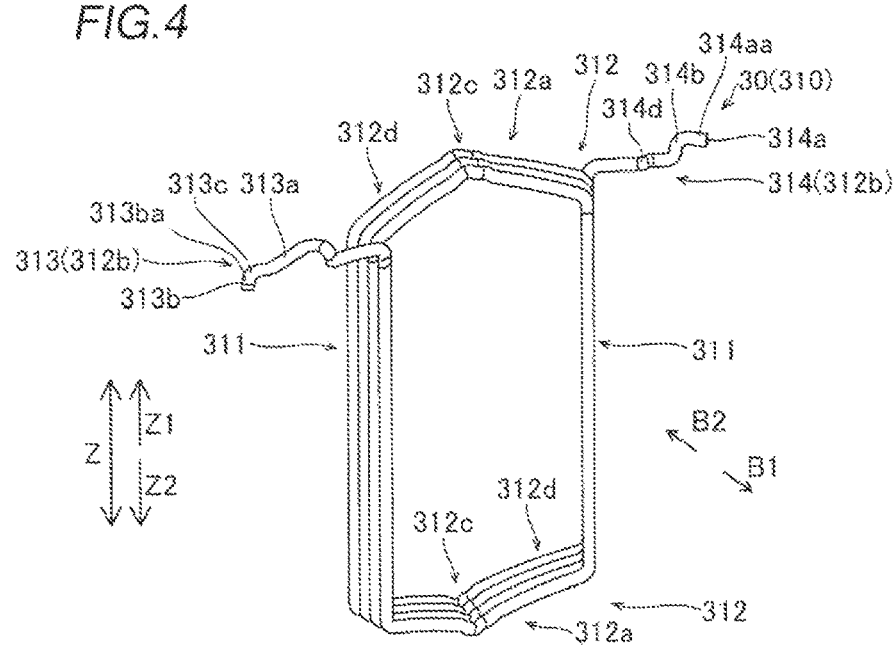
FIG. 4 is a perspective view of one type of coil of the stator according to the first embodiment of the present disclosure as viewed from the radially inner side.
Figure 5:
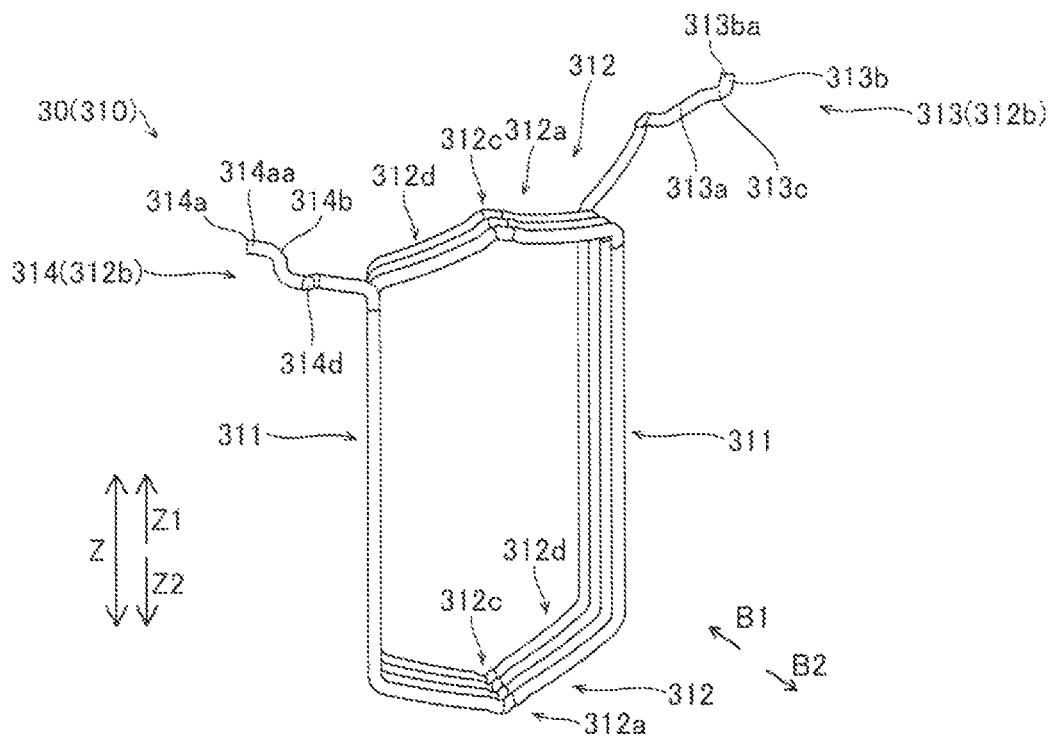
FIG. 5 is a perspective view of the one type of coil of the stator according to the first embodiment of the present disclosure as viewed from the radially outer side.
Figure 6:
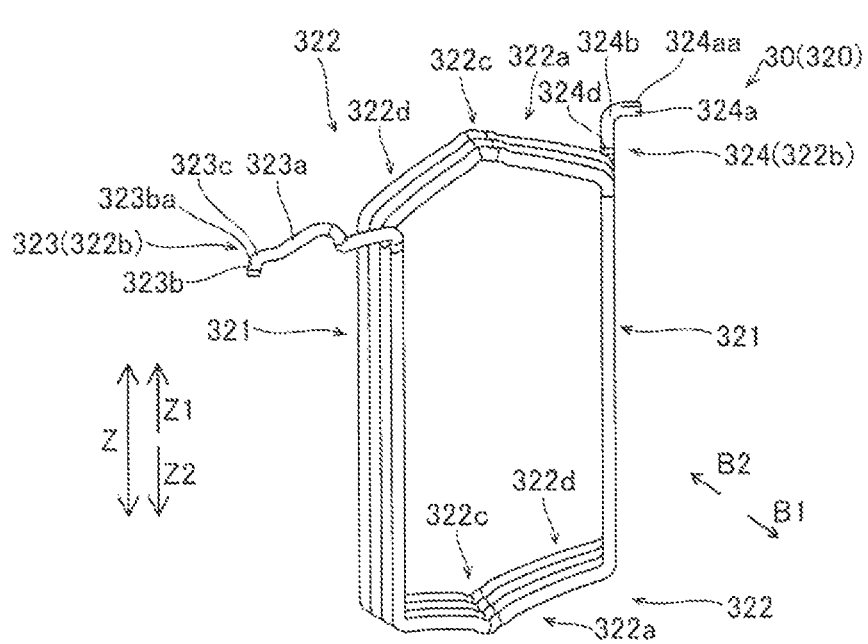
FIG. 6 is a perspective view of another type of coil of the stator according to the first embodiment of the present disclosure as viewed from the radially inner side.
Figure 7:
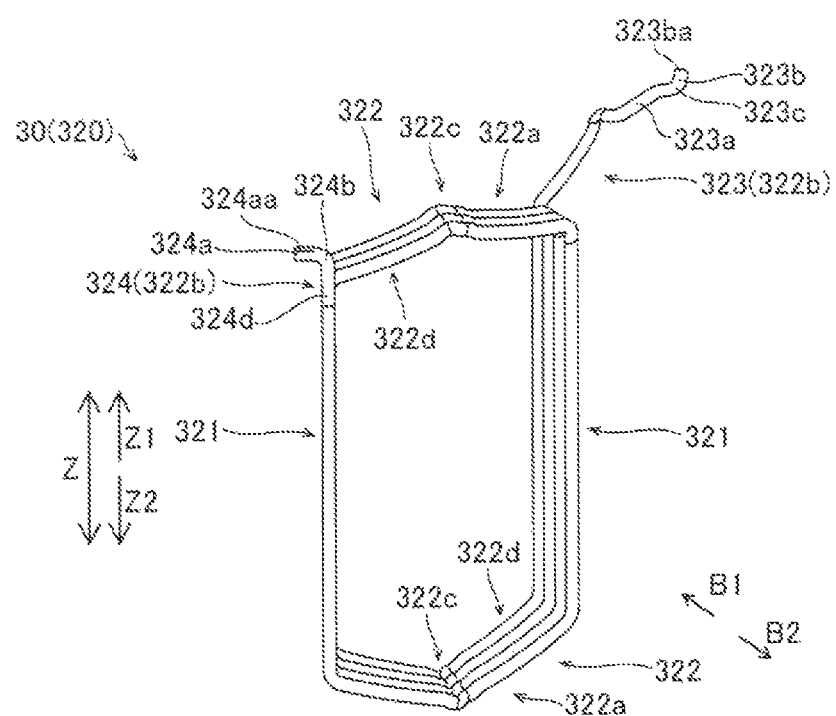
FIG. 7 is a perspective view of the another type of coil of the stator according to the first embodiment of the present disclosure as viewed from the radially outer side.

As shown in FIGS. 4 to 7, two types of coils 30 with different shapes are used in the stator 100. Hereinafter, one type of coil 30 shown in FIGS. 4 and 5 is referred to as a coil 310 and the other type of coil 30 shown in FIGS. 6 and 7 is referred to as a coil 320. The coils 310 and the coils 320 are alternately disposed in the plurality of slots 13 in the circumferential direction. The coils 30, 310, 320 are wound by distributed winding. First, the coil 310 will be described with reference to FIGS. 4 and 5. The coils 30, 310, 320 are an example of the "first coil" and the "second coil."

As shown in FIGS. 4 and 5, the coil 310 has slot-accommodated portions 311 and coil end portions 312. The slot-accommodated portions 311 are portions of the coil 310 which are accommodated in the slots 13 of the stator core 10. The slot-accommodated portions 311 have a generally linear shape. The coil end portions 312 are portions of the coil 310 which protrude from the ends in the direction of the rotation axis (Z direction) of the stator core 10 outward in the direction of the rotation axis. The coil end portions 312 include bent portions 312*a* connecting the slot-accommodated portions 311 and having a bent shape so as to protrude in the direction of the rotation axis and lead portions 312*b* (leads) for supplying electric power therethrough. Each bent portion 312*a* includes a crank portion 312*c* having a crank shape bent like steps of a staircase in the radial direction and curved portions 312*d* curved in an arc shape so as to conform to the arc shape of the stator core 10. The lead portions 312*b* include a radially inner-side lead portion 313 disposed on the radially inner side (the side in the B1 direction) and extending from the radially inner side toward the radially outer side (the side in the B2 direction) and a radially outer-side lead portion 314 located on the radially outer side. Both the radially inner-side lead portion 313 and the radially outer-side lead portion 314 are disposed on one side in the direction of the rotation axis (the side in the Z1 direction).

Figure 8:
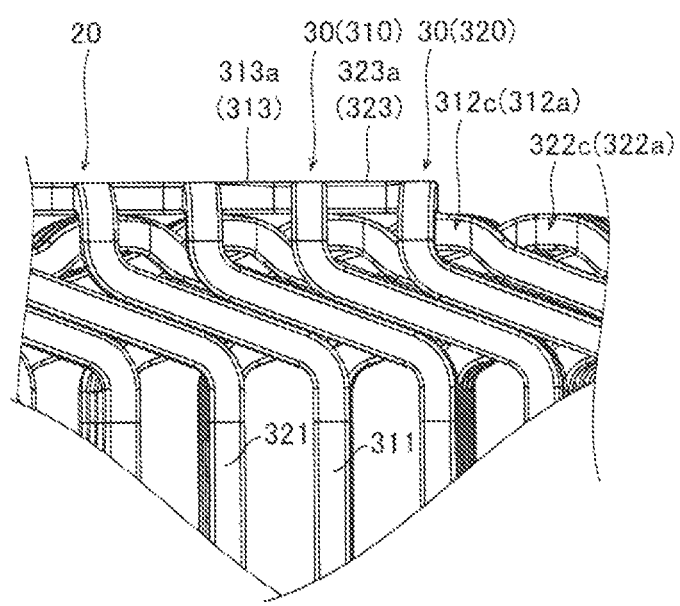
FIG. 8 is a partial enlarged side view of a coil unit of the stator according to the first embodiment of the present disclosure as viewed from the radially inner side.
Figure 9:
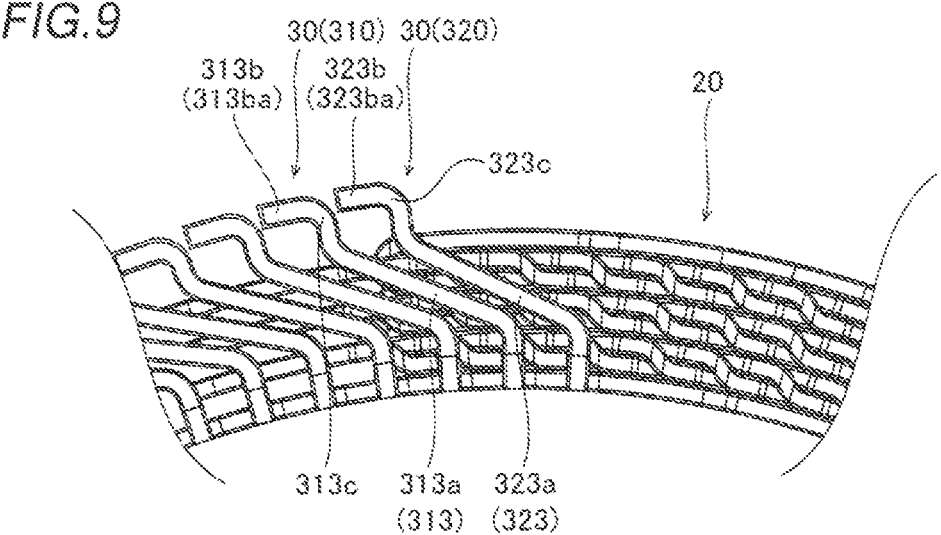
FIG. 9 is a partial enlarged plan view of the coil unit of the stator according to the first embodiment of the present disclosure.
Figure 10:
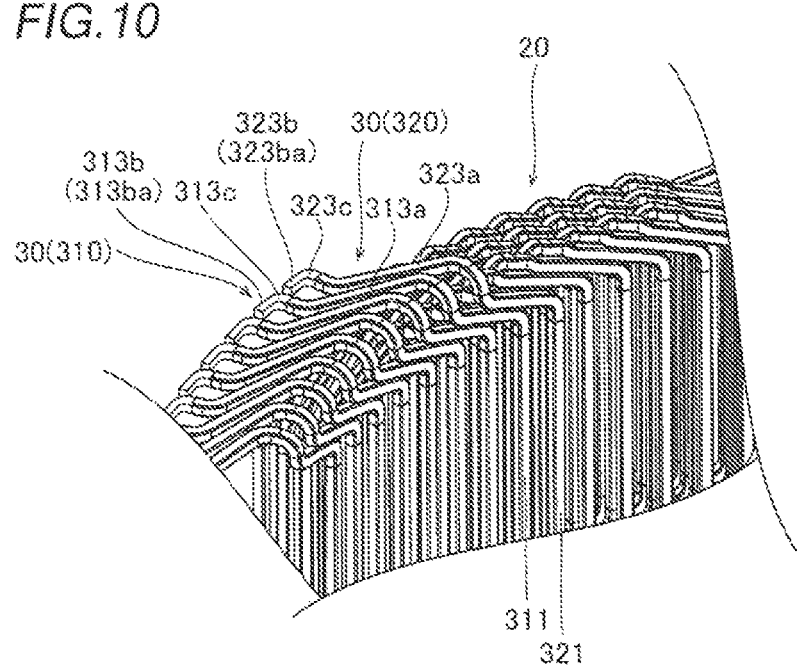
FIG. 10 is a partial enlarged perspective view of the coil unit of the stator according to the first embodiment of the present disclosure as viewed from the radially inner side.

The radially inner-side lead portion 313 is continuous with the radially innermost slot-accommodated portion 311. The radially inner-side lead portion 313 first extends from the radially innermost (farthest to the side in the B1 direction) slot-accommodated portion 311 toward the one side in the direction of the rotation axis at a position on the radially inner side of the slot 13 and then extends toward one side in the circumferential direction (the side in the A2 direction) from the radially inner side toward the radially outer side (the side in the B2 direction) (see FIG. 11). The radially inner-side lead portion 313 has a straight portion 313*a* extending toward the one side in the circumferential direction from the radially inner side toward the radially outer side and a bent portion 313*c* that bends a tip end 313*b* of the radially inner-side lead portion 313 so that the tip end 313*b* faces one direction in the circumferential direction (A2 direction). As shown in FIGS. 8 to 10, the straight portion 313*a* extends toward the one side in the circumferential direction so as to extend across the bent portions 312*a* of the coil end portions 312 in the radial direction. The straight portion 313*a* is formed outside the crank portions 312*c* of the bent portions 312*a* in the direction of the rotation axis by approximately an amount corresponding to a single rectangular wire so as to extend in the radial direction toward the one side in the circumferential direction. In order to facilitate understanding, FIGS. 8 to 10 show only a part of the coils 30 that form the coil unit 20. The bent portion 313*c* is formed near the tip end 313*b* of the radially inner-side lead portion 313. The bent portion 313*c* is shaped so as to bend the tip end 313*b* of the radially inner-side lead portion 313 radially inward from the direction in which the straight portion 313*a* extends so that the tip end 313*b* of the radially inner-side lead portion 313 faces the one direction in the circumferential direction (A2 direction).

The radially outer-side lead portion 314 is continuous with the radially outermost (farthest to the side in the B2 direction) slot-accommodated portion 311. The radially outer-side lead portion 314 first extends from the radially outermost slot-accommodated portion 311 toward the one side in the direction of the rotation axis (Z1 direction) at a position on the radially outer side of the slot 13 and then extends in the circumferential direction toward the other side in the circumferential direction (the side in the A1 direction) at a position near the coil end portions (312, 322) (at a position lower than the coil end portions (312, 322) in the direction of the rotation axis) (see FIG. 11). The radially outer-side lead portion 314 is longer than a radially outer-side lead portion 324, described later, of the coil 320 and extends radially inside the radially outer-side lead portion 324 farther toward the other side in the circumferential direction than the radially outer-side lead portion 324 does. The radially outer-side lead portion 314 has, near a tip end 314*a* thereof, a bent portion 314*b* that bends the tip end 314*a* of the radially outer-side lead portion 314 so that the tip end 314*a* faces the other direction in the circumferential direction. The bent portion 314*b* is shaped so as to bend the tip end 314*a* of the radially outer-side lead portion 314 from the direction of the rotation axis toward the other side in the circumferential direction.

Next, the coil 320 will be described with reference to FIGS. 6 and 7.

As shown in FIGS. 6 and 7, the coil 320 has slot-accommodated portions 321 and coil end portions 322. The coil end portions 322 include bent portions 322*a* and lead portions 322*b*. Each bent portion 322*a* includes a crank portion 322*c* and curved portions 322*d*. The lead portions 322*b* include a radially inner-side lead portion 323. The radially inner-side lead portion 323 has a straight portion 323*a* and a bent portion 323*c* that bends a tip end 323*b* of the radially inner-side lead portion 323 so that the tip end 323*b* faces the one direction in the circumferential direction (A2 direction). Since these configurations of the coil 320 are substantially similar to the corresponding configurations of the coil 310, detailed description thereof will be omitted. The lead portions 322*b* of the coil 320 include a radially outer-side lead portion 324. The radially outer-side lead portion 324 of the lead portions 322*b* of the coil 320 is different from the radially outer-side lead portion 314 of the lead portions 312*b* of the coil 310 in that the radially outer-side lead portion 324 is shorter than the radially outer-side lead portion 314. The radially outer-side lead portion 324 has, near a tip end 324*a* thereof, a bent portion 324*b* that bends the tip end 324*a* of the radially outer-side lead portion 324 so that the tip end 324*a* faces the other direction in the circumferential direction (A1 direction).

In the stator 100, the coils 30 (310, 320) whose tip ends are joined together are disposed in different slots 13. For example, the coils 30 (310, 320) whose tip ends are joined together are disposed in every sixth slot 13. In the stator 100, the tip end 313*b* of the radially inner-side lead portion 313 of the coil 310 is joined to the tip end 324*a* of the radially outer-side lead portion 324 of the coil 320, and the tip end 323*b* of the radially inner-side lead portion 323 of the coil 320 is joined to the tip end 314*a* of the radially outer-side lead portion 314 of the coil 310. That is, in the stator 100, the tip ends of the coils 310, 320 having different shapes are joined together. Such joining is performed by ultrasonic bonding, keyhole welding using high energy beams such as laser or electron beams, a conductive adhesive, etc.

Figure 11:
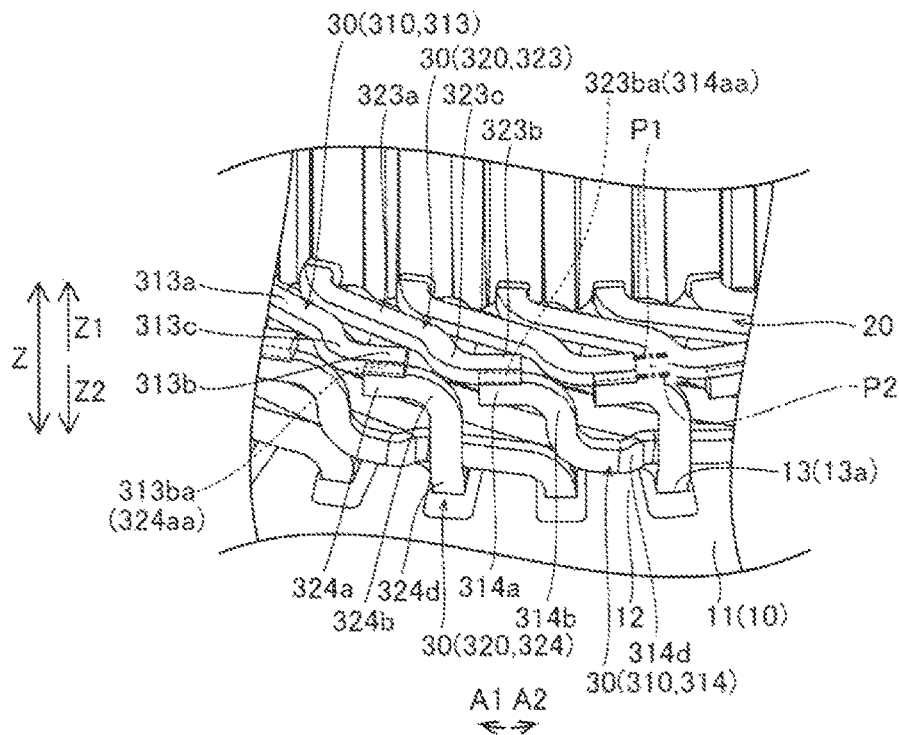
FIG. 11 is a partial enlarged perspective view of the stator according to the first embodiment of the present disclosure.

In the first embodiment, as shown in FIG. 11, a joining portion 313*ba* (323*ba*) of the tip end 313*b* (323*b*) of the radially inner-side lead portion 313 (323), extending toward the one side in the circumferential direction, of the coil 310 (320) and a joining portion 324*aa* (314*aa*) of the tip end 324*a* (314*a*) of the radially outer-side lead portion 324 (314), extending toward the other side in the circumferential direction, of the coil 320 (310) are joined together at radially outer portions of the coils 30 (310, 320) (near a root portion of the slot 13). The joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) are located radially outside the root portion of the slot 13 and radially inside the radially outermost part of the stator core 10 as viewed in the direction of the rotation axis. The joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) are joined together at a position radially outside the root portion of the slot 13 by approximately an amount corresponding to a single rectangular wire. The joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) are joined together at a position above the tooth 12 (a position overlapping the tooth 12 as viewed in plan).

The entire radially inner-side lead portion 313 (323) of the coil 310 (320) and the entire radially outer-side lead portion 324 (314) of the coil 320 (310) are located radially inside a position shifted radially outward from the root portion of the slot 13 (the radially outermost position P1 (shown by a thick dash-dotted line) of the slot 13) by an amount corresponding to a single rectangular wire forming the coil 310 (320) (the radially outermost position P2 (shown by a thick dash-dotted line) shifted by an amount corresponding to a single rectangular wire), as viewed in the direction of the rotation axis.

The joint portion of the radially inner-side lead portion 313 (323) of the coil 310 (320) and the radially outer-side lead portion 324 (314) of the coil 320 (310) is located at the radially outermost position of the coil 310 (320) as viewed in the direction of the rotation axis. That is, the entire coil 310 (320) is located radially inside the position P2 as viewed in the direction of the rotation axis. The position P2 shifted radially outward from the position P1 by an amount corresponding to a single rectangular wire means the position shifted radially outward from the position P1 by approximately an amount corresponding to a single rectangular wire. That is, the position P2 shifted radially outward from the position P1 by an amount corresponding to a single rectangular wire is a concept including not only the position P2 shifted radially outward from the position P1 by an amount corresponding to a single rectangular wire but also positions shifted slightly radially outward from the position P2. In the case where a wire has a longer side and a shorter side like a rectangular wire, an amount corresponding to a single wire may be either an amount corresponding to the longer side of a single rectangular wire or an amount corresponding to the shorter side of a single rectangular wire.

The joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) are joined together with the tip end 313*b* (323*b*) of the radially inner-side lead portion 313 (323) of the coil 310 (320) facing the one side in the circumferential direction (the side in the A2 direction) at a coil end and with the tip end 324*a* (314*a*) of the radially outer-side lead portion 324 (314) of the coil 320 (310) facing the other side in the circumferential direction (the side in the A1 direction) at the coil end. Both the tip end 313*b* (323*b*) of the radially inner-side lead portion 313 (323) of the coil 310 (320) and the tip end 324*a* (314*a*) of the radially outer-side lead portion 324 (314) of the coil 320 (310) face a direction tangential to the circumferential direction. The direction the tip end 313*b* (323*b*) of the radially inner-side lead portion 313 (323) of the coil 310 (320) faces is substantially parallel to the direction the tip end 324*a* (314*a*) of the radially outer-side lead portion 324 (314) of the coil 320 (310) faces.

In the first embodiment, the joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) are joined together in the direction of the rotation axis (Z direction). Specifically, the joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) are joined together in the direction of the rotation axis (Z direction) so that the tip end 324*a* (314*a*) of the radially outer-side lead portion 324 (314) of the coil 320 (310) is located closer to an end face of the stator core 10 in the direction of the rotation axis than (on the side in the Z2 direction with respect to) the tip end 313*b* (323*b*) of the radially inner-side lead portion 313 (323) of the coil 310 (320) is. The joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) are joined together in the direction of the rotation axis with the tip end 313*b* (323*b*) of the radially inner-side lead portion 313 (323) of the coil 310 (320) and the tip end 324*a* (314*a*) of the radially outer-side lead portion 324 (314) of the coil 320 (310) facing opposite directions in the circumferential direction and overlapping each other in the direction of the rotation axis.

Figure 12:
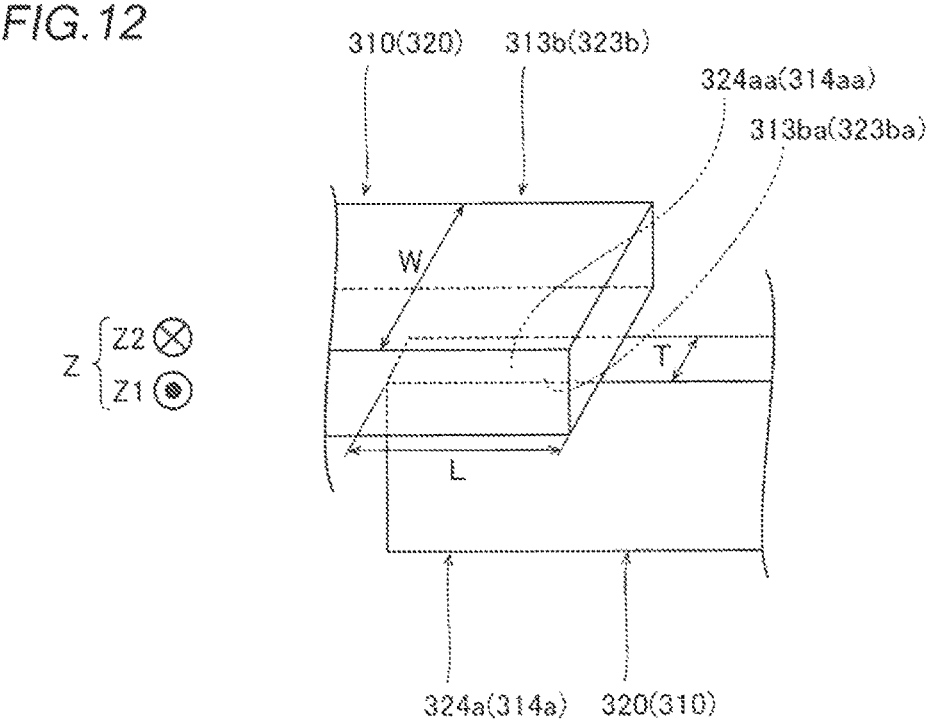
FIG. 12 is a schematic view illustrating the joint length of tip ends of lead portions of the coils of the stator according to the first embodiment of the present disclosure.
Figure 13:
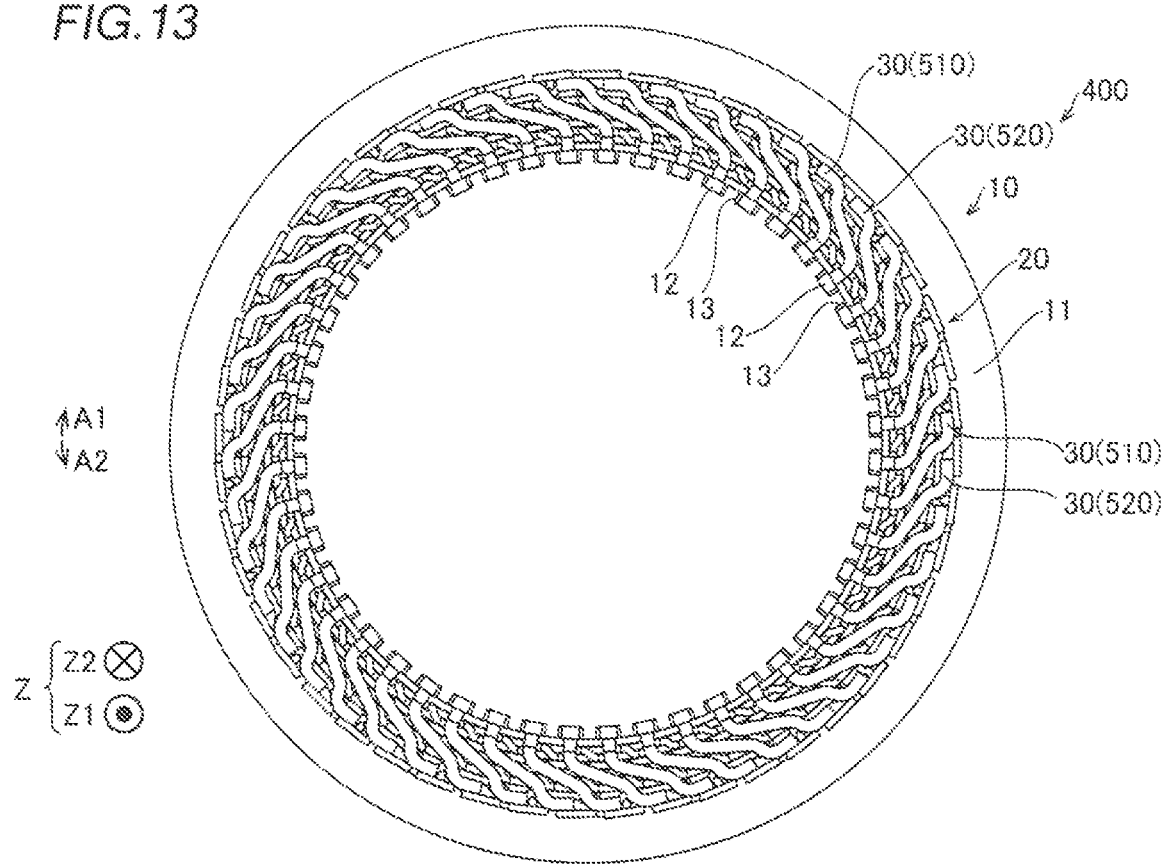
FIG. 13 is a plan view of a stator according to a second embodiment of the present disclosure.
Figure 14:
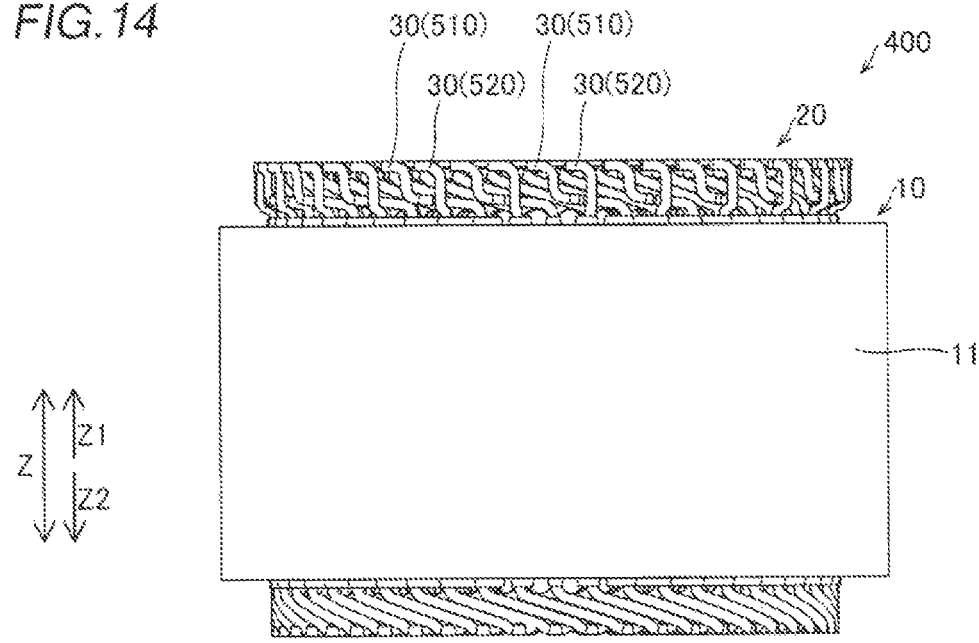
FIG. 14 is a side view of the stator according to the second embodiment of the present disclosure.
Figure 15:
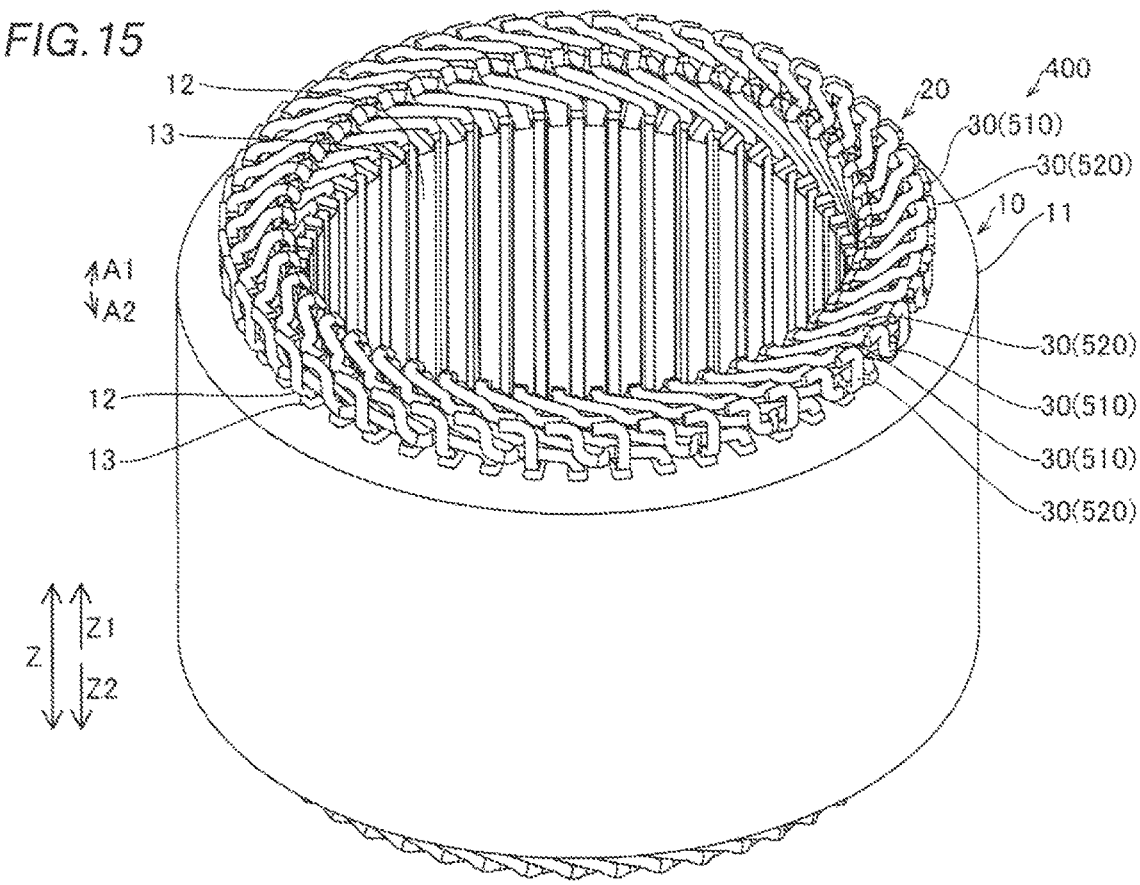
FIG. 15 is a perspective view of the stator according to the second embodiment of the present disclosure.

In the first embodiment, as shown in FIGS. 11 and 12, the joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) are joined together on the shorter side as viewed in cross section of the rectangular wire and the longer side as viewed in cross section of the rectangular wire. Specifically, the joining portion 313*ba* (323*ba*) of the tip end 313*b* (323*b*) of the radially inner-side lead portion 313 (323) of the coil 310 (320), which corresponds to the longer side as viewed in cross section of the rectangular wire, and the joining portion 324*aa* (314*aa*) of the tip end 324*a* (314*a*) of the radially outer-side lead portion 324 (314) of the coil 320 (310), which corresponds to the shorter side as viewed in cross section of the rectangular wire, are joined together. That is, the joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) are joined together so that the tip end 313*b* (323*b*) of the radially inner-side lead portion 313 (323) of the coil 310 (320) and the tip end 324*a* (314*a*) of the radially outer-side lead portion 324 (314) of the coil 320 (310) together have a T-shape in cross section. The joint length L of the joining portion 313*ba* (323*ba*) of the tip end 313*b* (323*b*) of the radially inner-side lead portion 313 (323) of the coil 310 (320) and the joining portion 324*aa* (314*aa*) of the tip end 324*a* (314*a*) of the radially outer-side lead portion 324 (314) of the coil 320 (310) is equal to or larger than the length T of the shorter side as viewed in cross section of the rectangular wire. Specifically, the joint length L is equal to or larger than the length W of the longer side as viewed in cross section of the rectangular wire.

As shown in FIGS. 4 to 7 and 11, the joining portion 324*aa* (314*aa*) of the tip end 324*a* (314*a*) of the radially outer-side lead portion 324 (314) of the coil 320 (310) is located near the root portion of the slot 13 at a position shifted radially outward from an exit position 13*a* where the radially outer-side lead portion 324 (314) of the coil 320 (310) extends out of the slot 13. Specifically, the joining portion 324*aa* (314*aa*) of the tip end 324*a* (314*a*) of the radially outer-side lead portion 324 (314) of the coil 320 (310) is located at a position shifted radially outward from the exit position 13*a* where the radially outer-side lead portion 324 (314) of the coil 320 (310) extends out of the slot 13 by approximately an amount corresponding to a single rectangular wire. The joining portion 324*aa* (314*aa*) of the radially outer-side lead portion 324 (314) of the coil 320 (310) has a bent portion 324*d* (314*d*) that bends the radially outer-side lead portion 324 (314) of the coil 320 (310) so that the tip end 324*a* (314*a*) of the radially outer-side lead portion 324 (314) of the coil 320 (310) is located at a position shifted radially outward from the exit position 13*a*. The bent portion 324*d* (314*d*) is shaped so as to be bent from the radially inner side toward the radially outer side so that the joining portion 324*aa* (314*aa*) of the tip end 324*a* (314*a*) of the radially outer-side lead portion 324 (314) of the coil 320 (310) is located at a position shifted radially outward from the exit position 13*a* by approximately an amount corresponding to a single rectangular wire.

Second Embodiment

Next, a second embodiment will be described with reference to FIGS. 13 to 16. The second embodiment will be described with respect to an example in which the tip ends of the coils which are joined together are joined in the radial direction unlike the first embodiment. The same configurations as those of the first embodiment are denoted with the same reference characters as those of the first embodiment in the figures, and description thereof will be omitted.

In a stator 400 according to the second embodiment of the present disclosure, as shown in FIGS. 13 to 16, a joining portion 513*ba* (523*ba*) of a tip end 513*b* (523*b*) of a radially inner-side lead portion 513 (523), extending toward one side in the circumferential direction, of a coil 510 (520) and a joining portion 524*aa* (514*aa*) of a tip end 524*a* (514*a*) of a radially outer-side lead portion 524 (514), extending toward the other side in the circumferential direction, of a coil 520 (510) are joined together in the radial direction at radially outer portions of the coils 510, 520 (near the root portion of the slot 13). The joining portion 513*ba* (523*ba*) of the tip end 513*b* (523*b*) of the radially inner-side lead portion 513 (523) of the coil 510 (520) and the joining portion 524*aa* (514*aa*) of the tip end 524*a* (514*a*) of the radially outer-side lead portion 524 (514) of the coil 520 (510) are located radially outside the root portion of the slot 13 and radially inside the radially outermost part of the stator core 10 as viewed in the direction of the rotation axis. The joining portion 513*ba* (523*ba*) of the tip end 513*b* (523*b*) of the radially inner-side lead portion 513 (523) of the coil 510 (520) and the joining portion 524*aa* (514*aa*) of the tip end 524*a* (514*a*) of the radially outer-side lead portion 524 (514) of the coil 520 (510) are joined together at a position radially outside the root portion of the slot 13 by approximately an amount corresponding to a single rectangular wire. The joining portion 513*ba* (523*ba*) of the tip end 513*b* (523*b*) of the radially inner-side lead portion 513 (523) of the coil 510 (520) and the joining portion 524*aa* (514*aa*) of the tip end 524*a* (514*a*) of the radially outer-side lead portion 524 (514) of the coil 520 (510) are joined together at a position above the tooth 12 (a position overlapping the tooth 12 as viewed in plan). The coils 510, 520 are an example of the "first coil" and the "second coil."

The entire radially inner-side lead portion 513 (523) of the coil 510 (520) and the entire radially outer-side lead portion 524 (514) of the coil 520 (510) are located radially inside a position shifted radially outward from the root portion of the slot 13 (the radially outermost position P1 (shown by a thick dash-dotted line) of the slot 13) by an amount corresponding to a single rectangular wire forming the coil 510 (520) (the radially outermost position P2 (shown by a thick dash-dotted line) shifted by an amount corresponding to a single rectangular wire), as viewed in the direction of the rotation axis. The joint portion of the radially inner-side lead portion 513 (523) of the coil 510 (520) and the radially outer-side lead portion 524 (514) of the coil 520 (510) is located at the radially outermost position of the coil 510 (520) as viewed in the direction of the rotation axis. That is, the entire coil 510 (520) is located radially inside the position P2 as viewed in the direction of the rotation axis.

The joining portion 513*ba* (523*ba*) of the tip end 513*b* (523*b*) of the radially inner-side lead portion 513 (523) of the coil 510 (520) and the joining portion 524*aa* (514*aa*) of the tip end 524*a* (514*a*) of the radially outer-side lead portion 524 (514) of the coil 520 (510) are joined together in the radial direction with the tip end 513b (523b) of the radially inner-side lead portion 513 (523) of the coil 510 (520) facing the one side in the circumferential direction (the side in the A2 direction) at a coil end and with the tip end 524a (514a) of the radially outer-side lead portion 524 (514) of the coil 520 (510) facing the other side in the circumferential direction (the side in the A1 direction) at the coil end. Both the tip end 513b (523b) of the radially inner-side lead portion 513 (523) of the coil 510 (520) and the tip end 524a (514a) of the radially outer-side lead portion 524 (514) of the coil 520 (510) face a direction tangential to the circumferential direction. The direction the tip end 513b (523b) of the radially inner-side lead portion 513 (523) of the coil 510 (520) faces is substantially parallel to the direction the tip end 524a (514a) of the radially outer-side lead portion 524 (514) of the coil 520 (510) faces.

In the second embodiment, the joining portion 513ba (523ba) of the tip end 513b (523b) of the radially inner-side lead portion 513 (523) of the coil 510 (520) and 524aa (514aa) of the tip end 524a (514a) of the radially outer-side lead portion 524 (514) of the coil 520 (510) are joined together in the radial direction so that the tip end 524a (514a) of the radially outer-side lead portion 524 (514) of the coil 520 (510) is located radially outside the tip end 513b (523b) of the radially inner-side lead portion 513 (523) of the coil 510 (520). The joining portion 513ba (523ba) of the tip end 513b (523b) of the radially inner-side lead portion 513 (523) of the coil 510 (520) and 524aa (514aa) of the tip end 524a (514a) of the radially outer-side lead portion 524 (514) of the coil 520 (510) are joined together in the radial direction with the tip end 513b (523b) of the radially inner-side lead portion 513 (523) of the coil 510 (520) and the tip end 524a (514a) of the radially outer-side lead portion 524 (514) of the coil 520 (510) facing opposite directions in the circumferential direction and overlapping each other in the radial direction.

Figure 16:
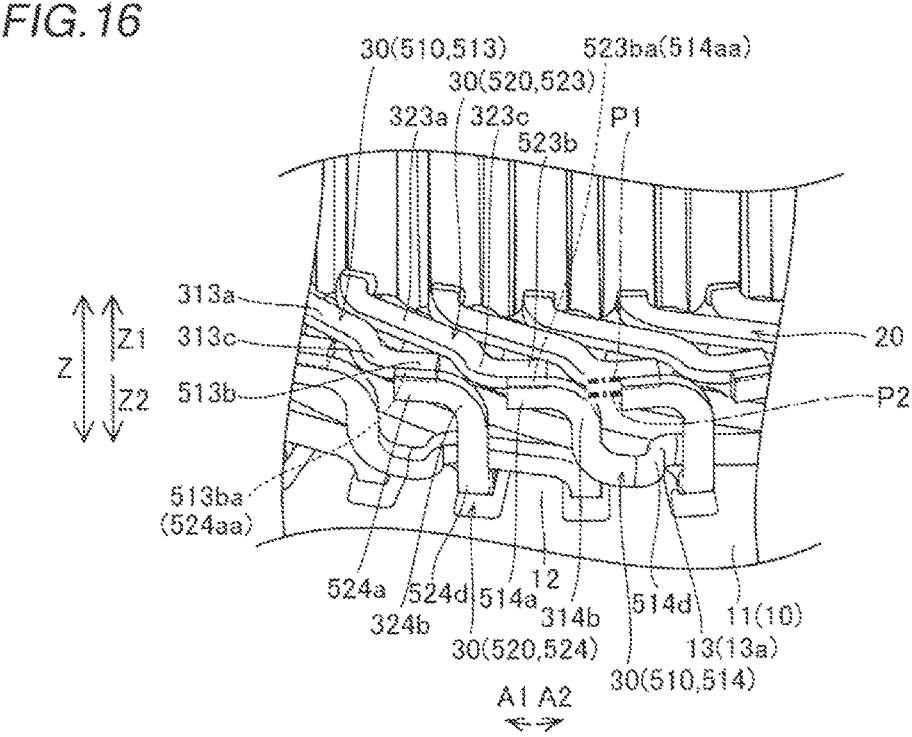
FIG. 16 is a partial enlarged perspective view of the stator according to the second embodiment of the present disclosure.

In the second embodiment as well, as shown in FIG. 16, the joining portion 513ba (523ba) of the tip end 513b (523b) of the radially inner-side lead portion 513 (523) of the coil 510 (520) and 524aa (514aa) of the tip end 524a (514a) of the radially outer-side lead portion 524 (514) of the coil 520 (510) are joined together on the shorter side as viewed in cross section of the rectangular wire and the longer side as viewed in cross section of the rectangular wire. Specifically, the joining portion 513ba (523ba) of the tip end 513b (523b) of the radially inner-side lead portion 513 (523) of the coil 510 (520), which corresponds to the shorter side as viewed in cross section of the rectangular wire, and the joining portion 524aa (514aa) of the tip end 524a (514a) of the radially outer-side lead portion 524 (514) of the coil 520 (510), which corresponds to the longer side as viewed in cross section of the rectangular wire, are joined together. That is, the joining portion 513ba (523ba) of the tip end 513b (523b) of the radially inner-side lead portion 513 (523) of the coil 510 (520) and 524aa (514aa) of the tip end 524a (514a) of the radially outer-side lead portion 524 (514) of the coil 520 (510) are joined together so that the tip end 513b (523b) of the radially inner-side lead portion 513 (523) of the coil 510 (520) and the tip end 524a (514a) of the radially outer-side lead portion 524 (514) of the coil 520 (510) together have a T-shape in cross section. The joint length of the joining portion 513ba (523ba) of the tip end 513b (523b) of the radially inner-side lead portion 513 (523) of the coil 510 (520) and the joining portion 524aa (514aa) of the tip end 524a (514a) of the radially outer-side lead portion 524 (514) of the coil 520 (510) is equal to or larger than the length of the shorter side as viewed in cross section of the rectangular wire, as in the first embodiment. Specifically, the joint length is equal to or larger than the length of the longer side as viewed in cross section of the rectangular wire, as in the first embodiment.

As shown in FIG. 16, the joining portion 524aa (514aa) of the tip end 524a (514a) of the radially outer-side lead portion 524 (514) of the coil 520 (510) is located near the root portion of the slot 13 at a position shifted radially outward from the exit position 13a where the radially outer-side lead portion 524 (514) of the coil 520 (510) extends out of the slot 13. Specifically, the joining portion 524aa (514aa) of the tip end 524a (514a) of the radially outer-side lead portion 524 (514) of the coil 520 (510) is located at a position shifted radially outward from the exit position 13a where the radially outer-side lead portion 524 (514) of the coil 520 (510) extends out of the slot 13 by approximately an amount corresponding to a single rectangular wire. The radially outer-side lead portion 524 (514) of the coil 520 (510) has a bent portion 524d (514d) that bends the radially outer-side lead portion 524 (514) of the coil 520 (510) so that the joining portion 524aa (514aa) of the tip end 524a (514a) of the radially outer-side lead portion 524 (514) of the coil 520 (510) is located at a position shifted radially outward from the exit position 13a. The bent portion 524d (514d) is shaped so as to be bent from the radially inner side toward the radially outer side so that the joining portion 524aa (514aa) of the tip end 524a (514a) of the radially outer-side lead portion 524 (514) of the coil 520 (510) is located at a position shifted radially outward from the exit position 13a by approximately an amount corresponding to a single rectangular wire.

Third Embodiment

Next, a third embodiment will be described with reference to FIGS. 17 and 18. The third embodiment will be described with respect to an example in which the radially inner-side lead portion does not have a bent portion near its tip end unlike the first and second embodiments. The same configurations as those of the first and second embodiments are denoted with the same reference characters as those of the first and second embodiments in the figures, and description thereof will be omitted.

Figure 17:
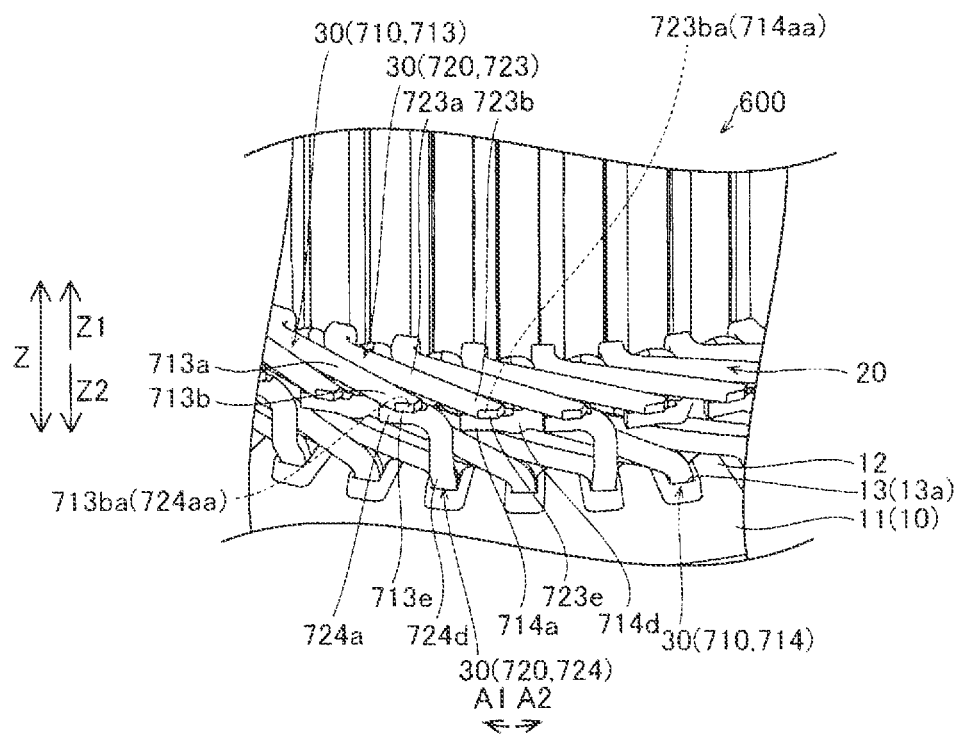
FIG. 17 is a partial enlarged perspective view of a stator according to a third embodiment of the present disclosure.
Figure 18:
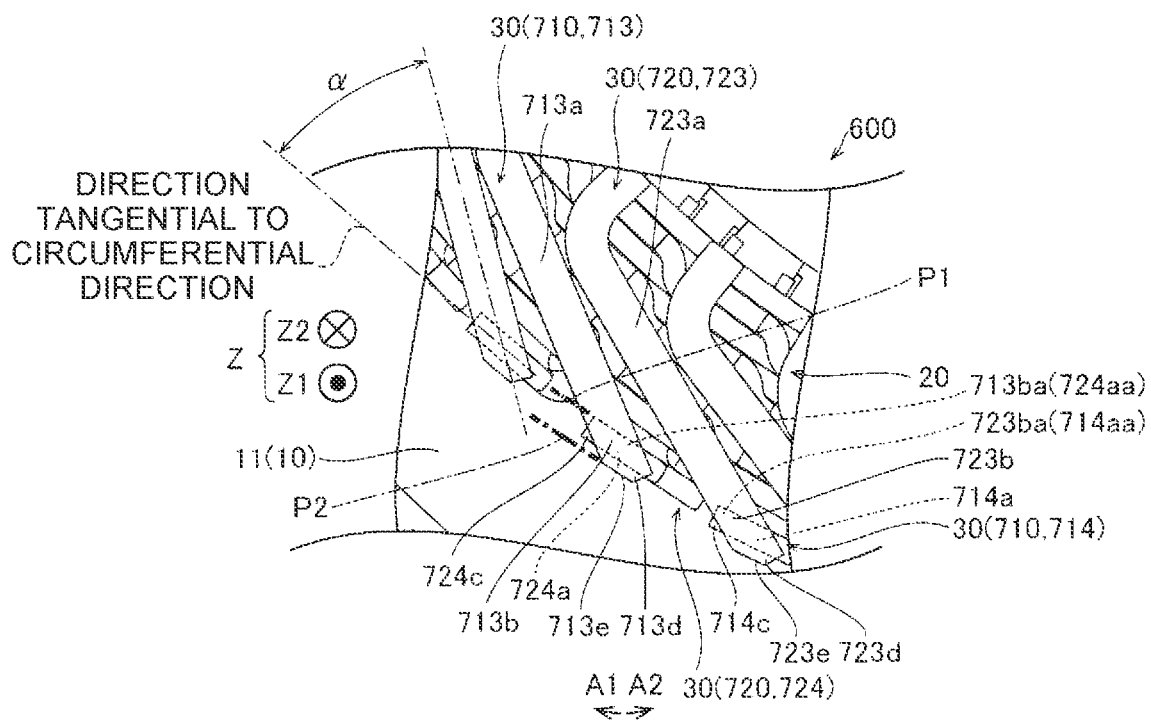
FIG. 18 is a partial enlarged plan view of the stator according to the third embodiment of the present disclosure.

In a stator 600 according to the third embodiment of the present disclosure, as shown in FIGS. 17 and 18, a joining portion 713ba (723ba) of a tip end 713b (723b) of a radially inner-side lead portion 713 (723), extending toward one side in the circumferential direction, of a coil 710 (720) and a joining portion 724aa (714aa) of a tip end 724a (714a) of a radially outer-side lead portion 724 (714), extending toward the other side in the circumferential direction, of a coil 720 (710) are joined together in the direction of the rotation axis at radially outer portions of the coils 710, 720 (near the root portion of the slot 13). The joining portion 713ba (723ba) of the tip end 713b (723b) of the radially inner-side lead portion 713 (723) of the coil 710 (720) and the joining portion 724aa (714aa) of the tip end 724a (714a) of the radially outer-side lead portion 724 (714) of the coil 720 (710) are located radially outside the root portion of the slot 13 and radially inside the radially outermost part of the stator core 10 as viewed in the direction of the rotation axis. The joining portion 713ba (723ba) of the tip end 713b (723b) of the radially inner-side lead portion 713 (723) of the coil 710 (720) and the joining portion 724aa (714aa) of the tip end 724a (714a) of the radially outer-side lead portion 724 (714) of the coil 720 (710) are joined together in the direction of the rotation axis at a position radially outside the root portion of the slot 13 by approximately an amount corresponding to a single rectangular wire. The joining portion 713ba (723ba) of the tip end 713b (723b) of the radially inner-side lead portion 713 (723) of the coil 710 (720) and the joining portion 724aa (714aa) of the tip end 724a (714a) of the radially outer-side lead portion 724 (714) of the coil 720 (710) are joined together at a position above the tooth 12 (a position overlapping the tooth 12 as viewed in plan). The coils 710, 720 are an example of the "first coil" and the "second coil."

The entire radially inner-side lead portion 713 (723) of the coil 710 (720) and the entire radially outer-side lead portion 724 (714) of the coil 720 (710) are located radially inside a position shifted radially outward from the root portion of the slot 13 (the radially outermost position P1 (shown by a thick dash-dotted line) of the slot 13) by an amount corresponding to a single rectangular wire forming the coil 710 (720) (the radially outermost position P2 (shown by a thick dash-dotted line) shifted by an amount corresponding to a single rectangular wire), as viewed in the direction of the rotation axis. The joint portion of the radially inner-side lead portion 713 (723) of the coil 710 (720) and the radially outer-side lead portion 724 (714) of the coil 720 (710) is located at the radially outermost position of the coil 710 (720) as viewed in the direction of the rotation axis. That is, the entire coil 710 (720) is located radially inside the position P2 as viewed in the direction of the rotation axis.

724aa (714aa) of the tip end 724a (714a) of the radially outer-side lead portion 724 (714) of the coil 720 (710) is located closer to an end face in the direction of the rotation axis than the tip end 713b (723b) of the radially inner-side lead portion 713 (723) of the coil 710 (720) is. The tip end 724a (714a) of the radially outer-side lead portion 724 (714) of the coil 720 (710) and the tip end 713b (723b) of the radially inner-side lead portion 713 (723) of the coil 710 (720) are located so as to overlap each other in the direction of the rotation axis. The joining portion 713ba (723ba) of the tip end 713b (723b) of the radially inner-side lead portion 713 (723) of the coil 710 (720) and the joining portion 724aa (714aa) of the tip end 724a (714a) of the radially outer-side lead portion 724 (714) of the coil 720 (710) are joined together on the shorter side as viewed in cross section of the rectangular wire and the longer side as viewed in cross section of the rectangular wire.

The joining portion 713ba (723ba) of the tip end 713b (723b) of the radially inner-side lead portion 713 (723) of the coil 710 (720) and the joining portion 724aa (714aa) of the tip end 724a (714a) of the radially outer-side lead portion 724 (714) of the coil 720 (710) are joined together in the direction of the rotation axis with the tip end 713b (723b) of the radially inner-side lead portion 713 (723) of the coil 710 (720) facing the one side in the circumferential direction (the side in the A2 direction) at a coil end and with the tip end 724a (714a) of the radially outer-side lead portion 724 (714) of the coil 720 (710) facing the other side in the circumferential direction (the side in the A1 direction) at the coil end.

In the third embodiment, the tip end 713b (723b) of the radially inner-side lead portion 713 (723) of the coil 710 (720) faces a direction crossing a direction tangential to the circumferential direction. Specifically, the tip end 713b (723b) of the radially inner-side lead portion 713 (723) of the coil 710 (720) faces a direction tilted at an angle α of less than approximately 45 degrees with respect to the direction tangential to the circumferential direction (A2 direction). The tip end 724a (714a) of the radially outer-side lead portion 724 (714) of the coil 720 (710) faces the direction tangential to the circumferential direction. The direction the tip end 713b (723b) of the radially inner-side lead portion 713 (723) of the coil 710 (720) faces crosses the direction the tip end 724a (714a) of the radially outer-side lead portion 724 (714) of the coil 720 (710) faces.

The tip end 713b (723b) of the radially inner-side lead portion 713 (723) of the coil 710 (720) has a protruding portion 713d (723d) that protrudes radially outward beyond the tip end 724a (714a) of the radially outer-side lead portion 724 (714) of the coil 720 (710) as viewed in plan (as viewed in the direction of the rotation axis). The protruding portion 713d (723d) of the radially inner-side lead portion 713 (723) of the coil 710 (720) protrudes radially outward slightly (by 1 mm or less) beyond the tip end 724a (714a) of the radially outer-side lead portion 724 (714) of the coil 720 (710). The protruding portion 713d (723d) of the radially inner-side lead portion 713 (723) of the coil 710 (720) protrudes in the direction in which the tip end 713b (723b) of the radially inner-side lead portion 713 (723) of the coil 710 (720) extends. The amount by which the protruding portion 713d (723d) of the radially inner-side lead portion 713 (723) of the coil 710 (720) protrudes is determined based on the amount by which the tip end 724a (714a) of the radially outer-side lead portion 724 (714) of the coil 720 (710) may be displaced (shifted from its designed position) in the radial direction during manufacturing. Forming the protruding portion 713d (723d) reliably provides a joint area between the tip ends even if the tip end 724a (714a) of the radially outer-side lead portion 724 (714) is shifted from its designed position during manufacturing.

The tip end 724a (714a) of the radially outer-side lead portion 724 (714) of the coil 720 (710) has a protruding portion 724c (714c) that protrudes toward the other side in the circumferential direction (the side in the A1 direction) beyond the tip end 713b (723b) of the radially inner-side lead portion 713 (723) of the coil 710 (720) as viewed in plan (as viewed in the direction of the rotation axis). The protruding portion 724c (714c) of the radially outer-side lead portion 724 (714) of the coil 720 (710) protrudes toward the other side in the circumferential direction slightly (by 1 mm or less) beyond the tip end 713b (723b) of the radially inner-side lead portion 713 (723) of the coil 710 (720). The protruding portion 724c (714c) of the radially outer-side lead portion 724 (714) of the coil 720 (710) protrudes in the direction in which the tip end 724a (714a) of the radially outer-side lead portion 724 (714) of the coil 720 (710) extends. The amount by which the protruding portion 724c (714c) of the radially outer-side lead portion 724 (714) of the coil 720 (710) protrudes is determined based on the amount by which the tip end 713b (723b) of the radially inner-side lead portion 713 (723) of the coil 710 (720) may be displaced (shifted from its designed position) in the circumferential direction during manufacturing. Forming the protruding portion 724c (714c) reliably provides a joint area between the tip ends even if the tip end 713b (723b) of the radially inner-side lead portion 713 (723) is shifted from its designed position during manufacturing.

In the third embodiment, a straight portion 713a (723a) of the radially inner-side lead portion 713 (723) of the coil 710 (720) extends straight to the tip end 713b (723b) toward the one side in the circumferential direction from the radially inner side toward the radially outer side. That is, in the third embodiment, the radially inner-side lead portion 713 (723) of the coil 710 (720) does not have the bent portion 313c (323c) of the first embodiment and the straight portion 713a (723a) extends to the tip end 713b (723b).

In the third embodiment, the tip end 713*b* (723*b*) of the straight portion 713*a* (723*a*) of the radially inner-side lead portion 713 (723) of the coil 710 (720) has a chamfered portion 713*e* (723*e*) on its radially outer side. The chamfered portion 713*e* (723*e*) of the radially inner-side lead portion 713 (723) of the coil 710 (720) is formed by chamfering the radially outer corner of the tip end 713*b* (723*b*) of the radially inner-side lead portion 713 (723) of the coil 710 (720). The chamfered portion 713*e* (723*e*) of the radially inner-side lead portion 713 (723) of the coil 710 (720) is formed in the protruding portion 713*d* (723*d*) of the radially inner-side lead portion 713 (723) of the coil 710 (720). The chamfered portion 713*e* (723*e*) of the radially inner-side lead portion 713 (723) of the coil 710 (720) is formed by chamfering a part of the protruding portion 713*d* (723*d*) of the radially inner-side lead portion 713 (723) of the coil 710 (720).

In the third embodiment, the joining portion 724*aa* (714*aa*) of the tip end 724*a* (714*a*) of the radially outer-side lead portion 724 (714) of the coil 720 (710) is located near the root portion of the slot 13 at a position shifted radially outward from the exit position 13*a* where the radially outer-side lead portion 724 (714) of the coil 720 (710) extends out of the slot 13. Specifically, the joining portion 724*aa* (714*aa*) of the tip end 724*a* (714*a*) of the radially outer-side lead portion 724 (714) of the coil 720 (710) is located at a position shifted radially outward from the exit position 13*a* where the radially outer-side lead portion 724 (714) of the coil 720 (710) extends out of the slot 13 by approximately an amount corresponding to a single rectangular wire. The radially outer-side lead portion 724 (714) of the coil 720 (710) has a bent portion 724*d* (714*d*) that bends the radially outer-side lead portion 724 (714) of the coil 720 (710) so that the joining portion 724*aa* (714*aa*) of the tip end 724*a* (714*a*) of the radially outer-side lead portion 724 (714) of the coil 720 (710) is located at a position shifted radially outward from the exit position 13*a*. The bent portion 724*d* (714*d*) is shaped so as to be bent from the radially inner side toward the radially outer side so that the joining portion 724*aa* (714*aa*) of the tip end 724*a* (714*a*) of the radially outer-side lead portion 724 (714) of the coil 720 (710) is located at a position shifted radially outward from the exit position 13*a* by approximately an amount corresponding to a single rectangular wire.

Fourth Embodiment

Next, a fourth embodiment will be described with reference to FIG. 19. The fourth embodiment will be described with respect to an example in which the radially inner-side lead portion does not have a bent portion near its tip end and the tip ends of the coils which are joined together are joined in the radial direction. The same configurations as those of the first to third embodiments are denoted with the same reference characters as those of the first to third embodiments in the figures, and description thereof will be omitted.

Figure 19:
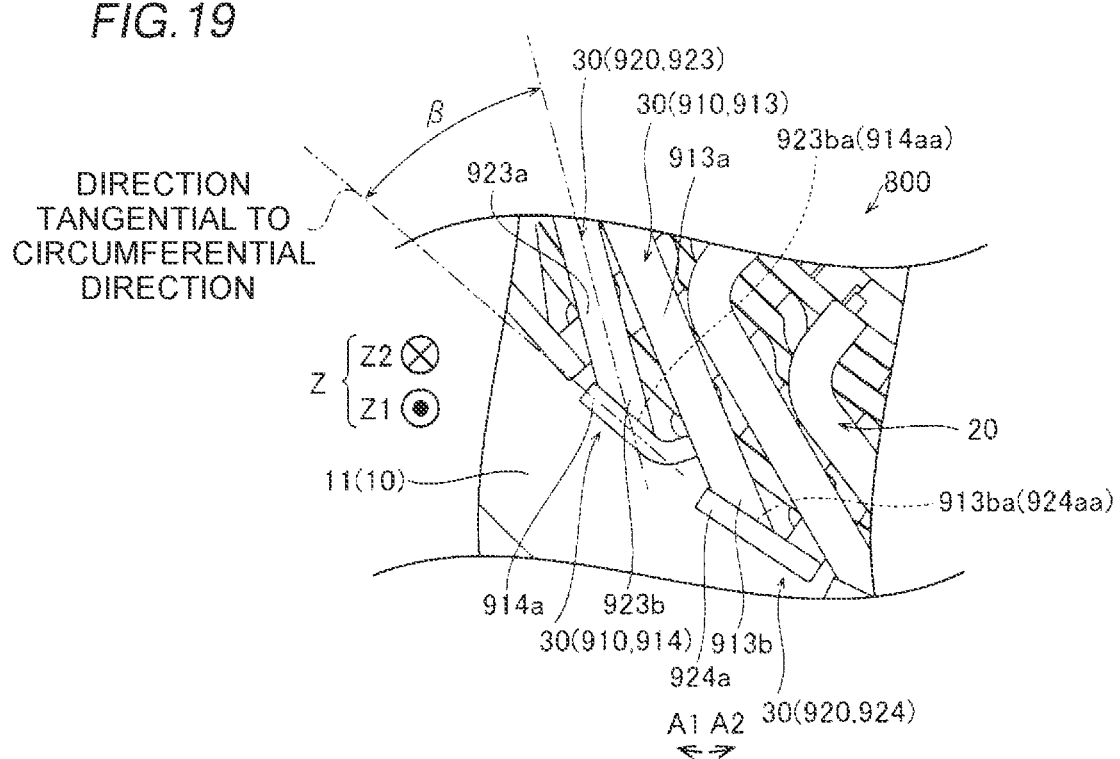
FIG. 19 is a partial enlarged plan view of a stator according to a fourth embodiment of the present disclosure.

In a stator 800 according to the fourth embodiment of the present disclosure, as shown in FIG. 19, a joining portion 913*ba* (923*ba*) of a tip end 913*b* (923*b*) of a radially inner-side lead portion 913 (923), extending toward one side in the circumferential direction, of a coil 910 (920) and a joining portion 924*aa* (914*aa*) of a tip end 924*a* (914*a*) of a radially outer-side lead portion 924 (914), extending toward the other side in the circumferential direction, of a coil 920 (910) are joined together in the radial direction at radially outer portions of the coils 910, 920 (near the root portion of the slot 13). The joining portion 913*ba* (923*ba*) of the tip end 913*b* (923*b*) of the radially inner-side lead portion 913 (923) of the coil 910 (920) and the joining portion 924*aa* (914*aa*) of the tip end 924*a* (914*a*) of the radially outer-side lead portion 924 (914) of the coil 920 (910) are located radially outside the root portion of the slot 13 and radially inside the radially outermost part of the stator core 10 as viewed in the direction of the rotation axis. The joining portion 913*ba* (923*ba*) of the tip end 913*b* (923*b*) of the radially inner-side lead portion 913 (923) of the coil 910 (920) and the joining portion 924*aa* (914*aa*) of the tip end 924*a* (914*a*) of the radially outer-side lead portion 924 (914) of the coil 920 (910) are joined together in the radial direction at a position radially outside the root portion of the slot 13 by approximately an amount corresponding to a single rectangular wire. The joining portion 913*ba* (923*ba*) of the tip end 913*b* (923*b*) of the radially inner-side lead portion 913 (923) of the coil 910 (920) and the joining portion 924*aa* (914*aa*) of the tip end 924*a* (914*a*) of the radially outer-side lead portion 924 (914) of the coil 920 (910) are joined together at a position above the tooth 12 (a position overlapping the tooth 12 as viewed in plan). The coils 910, 920 are an example of the "first coil" and the "second coil."

The tip end 924*a* (914*a*) of the radially outer-side lead portion 924 (914) of the coil 920 (910) is located radially outside the tip end 913*b* (923*b*) of the radially inner-side lead portion 913 (923) of the coil 910 (920). The tip end 924*a* (914*a*) of the radially outer-side lead portion 924 (914) of the coil 920 (910) and the tip end 913*b* (923*b*) of the radially inner-side lead portion 913 (923) of the coil 910 (920) are located so as to overlap each other in the radial direction. The joining portion 913*ba* (923*ba*) of the tip end 913*b* (923*b*) of the radially inner-side lead portion 913 (923) of the coil 910 (920) and the joining portion 924*aa* (914*aa*) of the tip end 924*a* (914*a*) of the radially outer-side lead portion 924 (914) of the coil 920 (910) are joined together on the shorter side as viewed in cross section of the rectangular wire and the longer side as viewed in cross section of the rectangular wire.

The joining portion 913*ba* (923*ba*) of the tip end 913*b* (923*b*) of the radially inner-side lead portion 913 (923) of the coil 910 (920) and the joining portion 924*aa* (914*aa*) of the tip end 924*a* (914*a*) of the radially outer-side lead portion 924 (914) of the coil 920 (910) are joined together in the radial direction with the tip end 913*b* (923*b*) of the radially inner-side lead portion 913 (923) of the coil 910 (920) facing the one side in the circumferential direction (the side in the A2 direction) at a coil end and with the tip end 924*a* (914*a*) of the radially outer-side lead portion 924 (914) of the coil 920 (910) facing the other side in the circumferential direction (the side in the A1 direction) at the coil end.

In the fourth embodiment, the tip end 913*b* (923*b*) of the radially inner-side lead portion 913 (923) of the coil 910 (920) faces a direction crossing a direction tangential to the circumferential direction. Specifically, the tip end 913*b* (923*b*) of the radially inner-side lead portion 913 (923) of the coil 910 (920) faces a direction tilted at an angle β of less than approximately 45 degrees with respect to the direction tangential to the circumferential direction (A2 direction). The tip end 924*a* (914*a*) of the radially outer-side lead portion 924 (914) of the coil 920 (910) faces the direction tangential to the circumferential direction. The direction the tip end 913*b* (923*b*) of the radially inner-side lead portion 913 (923) of the coil 910 (920) faces crosses the direction the tip end 924*a* (914*a*) of the radially outer-side lead portion 924 (914) of the coil 920 (910) faces.

In the fourth embodiment, a straight portion 913*a* (923*a*) of the radially inner-side lead portion 913 (923) of the coil 910 (920) extends straight to the tip end 913b (923b) toward the one side in the circumferential direction from the radially inner side toward the radially outer side. That is, in the fourth embodiment as well, the radially inner-side lead portion 913 (923) of the coil 910 (920) does not have the bent portion 313c (323c) of the first embodiment and the straight portion 913a (923a) extends to the tip end 913b (923b).

Effects of First to Fourth Embodiments

The first to fourth embodiments have the following effects.

In the first to fourth embodiments, as described above, the joining portion (313ba, 323ba, 513ba, 523ba, 713ba, 723ba, 913ba, 923ba) of the tip end (313b, 323b, 513b, 523b, 713b, 723b, 913b, 923b) of the lead portion (313, 323, 513, 523, 713, 723, 913, 923), extending toward the one side in the circumferential direction, of the first coil (30, 310, 320, 510, 520, 710, 720, 910, 920) is joined to the joining portion (314aa, 324aa, 514aa, 524aa, 714aa, 724aa, 914aa, 924aa) of the tip end (314a, 324a, 514a, 524a, 714a, 724a, 914a, 924a) of the lead portion (314, 324, 514, 524, 714, 724, 914, 924), extending toward the other side in the circumferential direction, of the second coil (30, 310, 320, 510, 520, 710, 720, 910, 920). The joint portion of the tip end (313b, 323b, 513b, 523b, 713b, 723b, 913b, 923b) of the lead portion (313, 323, 513, 523, 713, 723, 913, 923) of the first coil (30, 310, 320, 510, 520, 710, 720, 910, 920) and the tip end (314a, 324a, 514a, 524a, 714a, 724a, 914a, 924a) of the lead portion (314, 324, 514, 524, 714, 724, 914, 924) of the second coil (30, 310, 320, 510, 520, 710, 720, 910, 920) thus extends in the circumferential direction. The joint portion can thus be prevented from extending into a region outside the radially outer part (back yoke (11)) of the stator core (10) in the direction of the rotation axis, as compared to the case where the joint portion extends radially outward. This ensures that little space is occupied in the region outside the radially outer part of the stator core (10) in the direction of the rotation axis.

In the case where the joint portion extends radially outward, it is difficult to dispose a structure (e.g., a structure for cooling the coils) in the space outside the radially outer part of the stator core (10) in the direction of the rotation axis. It is thus difficult to make use of this space. In the embodiments, however, since little space is occupied in the region outside the radially outer part of the stator core (10) in the direction of the rotation axis as described above, enough space can be made available in the region outside the radially outer part of the stator core (10) in the direction of the rotation axis. Since enough space is available, it is easy to dispose a structure such as a structure for cooling the coils in the space outside the radially outer part of the stator core (10) in the direction of the rotation axis. It is therefore easy to effectively use the space outside the radially outer part of the stator core (10) in the direction of the rotation axis. Moreover, since enough space is available, a sufficient insulation distance can be easily provided between the first coil (30, 310, 320, 510, 520, 710, 720, 910, 920) and the second coil (30, 310, 320, 510, 520, 710, 720, 910, 920) and a structure even when the structure is disposed in the space outside the radially outer part of the stator core (10) in the direction of the rotation axis.

The joining portion (313ba, 323ba, 513ba, 523ba, 713ba, 723ba, 913ba, 923ba) of the tip end (313b, 323b, 513b, 523b, 713b, 723b, 913b, 923b) of the lead portion (313, 323, 513, 523, 713, 723, 913, 923), extending toward the one side in the circumferential direction, of the first coil (30, 310, 320, 510, 520, 710, 720, 910, 920) is joined to the joining portion (314aa, 324aa, 514aa, 524aa, 714aa, 724aa, 914aa, 924aa) of the tip end (314a, 324a, 514a, 524a, 714a, 724a, 914a, 924a) of the lead portion (314, 324, 514, 524, 714, 724, 914, 924), extending toward the other side in the circumferential direction, of the second coil (30, 310, 320, 510, 520, 710, 720, 910, 920). This allows the tip end (313b, 323b, 513b, 523b, 713b, 723b, 913b, 923b) of the lead portion (313, 323, 513, 523, 713, 723, 913, 923) of the first coil (30, 310, 320, 510, 520, 710, 720, 910, 920) and the tip end (314a, 324a, 514a, 524a, 714a, 724a, 914a, 924a) of the lead portion (314, 324, 514, 524, 714, 724, 914, 924) of the second coil (30, 310, 320, 510, 520, 710, 720, 910, 920) to be joined together with the tip end (313b, 323b, 513b, 523b, 713b, 723b, 913b, 923b) of the lead portion (313, 323, 513, 523, 713, 723, 913, 923) of the first coil (30, 310, 320, 510, 520, 710, 720, 910, 920) and the tip end (314a, 324a, 514a, 524a, 714a, 724a, 914a, 924a) of the lead portion (314, 324, 514, 524, 714, 724, 914, 924) of the second coil (30, 310, 320, 510, 520, 710, 720, 910, 920) extending in such directions that the tip ends get closer to each other. This can reduce both the length of the lead portion (313, 323, 513, 523, 713, 723, 913, 923) of the first coil (30, 310, 320, 510, 520, 710, 720, 910, 920) and the length of the lead portion (314, 324, 514, 524, 714, 724, 914, 924) of the second coil (30, 310, 320, 510, 520, 710, 720, 910, 920) as compared to the case where the tip end (313b, 323b, 513b, 523b, 713b, 723b, 913b, 923b) of the lead portion (313, 323, 513, 523, 713, 723, 913, 923) of the first coil (30, 310, 320, 510, 520, 710, 720, 910, 920) and the tip end (314a, 324a, 514a, 524a, 714a, 724a, 914a, 924a) of the lead portion (314, 324, 514, 524, 714, 724, 914, 924) of the second coil (30, 310, 320, 510, 520, 710, 720, 910, 920) are joined together with both of the tip ends facing the same direction in the circumferential direction.

In the case where the tip end (313b, 323b, 513b, 523b, 713b, 723b, 913b, 923b) of the lead portion (313, 323, 513, 523, 713, 723, 913, 923) of the first coil (30, 310, 320, 510, 520, 710, 720, 910, 920) and the tip end (314a, 324a, 514a, 524a, 714a, 724a, 914a, 924a) of the lead portion (314, 324, 514, 524, 714, 724, 914, 924) of the second coil (30, 310, 320, 510, 520, 710, 720, 910, 920) are joined together with both of the tip ends facing the same direction, the joint portion is supported only on one side. Deformation is therefore likely to occur due to external vibration or electromagnetic vibration that is caused by a current flowing in the coils. In the first to fourth embodiments, however, the tip end (313b, 323b, 513b, 523b, 713b, 723b, 913b, 923b) of the lead portion (313, 323, 513, 523, 713, 723, 913, 923) of the first coil (30, 310, 320, 510, 520, 710, 720, 910, 920) and the tip end (314a, 324a, 514a, 524a, 714a, 724a, 914a, 924a) of the lead portion (314, 324, 514, 524, 714, 724, 914, 924) of the second coil (30, 310, 320, 510, 520, 710, 720, 910, 920) are joined together with the tip ends facing opposite directions in the circumferential direction. The joint portion is therefore supported on both sides. This can reduce the phenomenon that deformation occurs due to external vibration or electromagnetic vibration that is caused by a current flowing in the coils.

In the first to fourth embodiments, as described above, the lead portion (313, 323, 513, 523, 713, 723, 913, 923) of the first coil (30, 310, 320, 510, 520, 710, 720, 910, 920) first extends in the direction of the rotation axis at a position on the radially inner side of the slot (13) and then extends toward the one side in the circumferential direction from the radially inner side toward the radially outer side, and the lead portion (314, 324, 514, 524, 714, 724, 914, 924) of the second coil (30, 310, 320, 510, 520, 710, 720, 910, 920) first extends in the direction of the rotation axis at a position on the radially outer side of the slot (13) and then extends toward the other side in the circumferential direction at a position near the coil end portions (312, 322). With this configuration, each part before the tip end including the joining portion extends in the circumferential direction and the tip ends are connected in the circumferential direction. Accordingly, the coil is not unnecessarily folded back in the part from the portion protruding toward a coil end in the direction of the rotation axis to the joining portion. A compact stator (100, 400, 600, 800) is thus implemented with little space being occupied in the region outside the radially outer part of the stator core (10) in the direction of the rotation axis.

In the first and third embodiments, as described above, the lead portion (314, 324, 714, 724) of the second coil (30, 310, 320, 710, 720) first extends in the direction of the rotation axis at a position on the radially outer side of the slot (13) and then extends toward the other side in the circumferential direction at a position lower than the coil end portions (312, 322) in the direction of the rotation axis. This configuration can restrain an increase in size of the stator (100, 600) in the direction of the rotation axis due to the lead portion (314, 324, 714, 724) of the second coil (30, 310, 320, 710, 720).

In the first to third embodiments, as described above, the entire lead portion (313, 323, 513, 523, 713, 723) of the first coil (30, 310, 320, 510, 520, 710, 720) and the entire lead portion (314, 324, 514, 524, 714, 724) of the second coil (30, 310, 320, 510, 520, 710, 720) are located radially inside a position shifted radially outward from the root portion of the slot by an amount corresponding to a single wire forming the first coil (30, 310, 320, 510, 520, 710, 720) or the second coil (30, 310, 320, 510, 520, 710, 720), as viewed in the direction of the rotation axis. This configuration can reliably prevent the joint portion from extending into the region outside the radially outer part (back yoke (11)) of the stator core (10) in the direction of the rotation axis and thus more reliably ensures that little space is occupied in the region outside the radially outer part of the stator core (10) in the direction of the rotation axis.

In the first to fourth embodiments, as described above, both the first coil (30, 310, 320, 510, 520, 710, 720, 910, 920) and the second coil (30, 310, 320, 510, 520, 710, 720, 910, 920) have the radially inner-side lead portion (313, 323, 513, 523, 713, 723, 913, 923) extending from the radially inner side toward the radially outer side and the radially outer-side lead portion (314, 324, 514, 524, 714, 724, 914, 924) disposed on the radially outer side, and the joining portion (313ba, 323ba, 513ba, 523ba, 713ba, 723ba, 913ba, 923ba) of the tip end (313b, 323b, 513b, 523b, 713b, 723b, 913b, 923b) of the radially inner-side lead portion (313, 323, 513, 523, 713, 723, 913, 923) of the first coil (30, 310, 320, 510, 520, 710, 720, 910, 920) is joined to the joining portion (314aa, 324aa, 514aa, 524aa, 714aa, 724aa, 914aa, 924aa) of the tip end (314a, 324a, 514a, 524a, 714a, 724a, 914a, 924a) of the radially outer-side lead portion (314, 324, 514, 524, 714, 724, 914, 924) of the second coil (30, 310, 320, 510, 520, 710, 720, 910, 920). This configuration can prevent the joint portion of the tip end (313b, 323b, 513b, 523b, 713b, 723b, 913b, 923b) of the radially inner-side lead portion (313, 323, 513, 523, 713, 723, 913, 923) of the first coil (30, 310, 320, 510, 520, 710, 720, 910, 920) and the tip end (314a, 324a, 514a, 524a, 714a, 724a, 914a, 924a) of the radially outer-side lead portion (314, 324, 514, 524, 714, 724, 914, 924) of the second coil (30, 310, 320, 510, 520, 710, 720, 910, 920) from extending into the region outside the radially outer part of the stator core (10) in the direction of the rotation axis and can make enough space available in the region outside the radially outer part of the stator core (10) in the direction of the rotation axis.

In the first to fourth embodiments, as described above, the radially inner-side lead portion (313, 323, 513, 523, 713, 723, 913, 923) extends toward the one side in the circumferential direction from the radially inner side toward the radially outer side, and the joining portion (313ba, 323ba, 513ba, 523ba, 713ba, 723ba, 913ba, 923ba) of the tip end (313b, 323b, 513b, 523b, 713b, 723b, 913b, 923b) of the radially inner-side lead portion (313, 323, 513, 523, 713, 723, 913, 923) of the first coil (30, 310, 320, 510, 520, 710, 720, 910, 920) and the joining portion (314aa, 324aa, 514aa, 524aa, 714aa, 724aa, 914aa, 924aa) of the tip end (314a, 324a, 514a, 524a, 714a, 724a, 914a, 924a) of the radially outer-side lead portion (314, 324, 514, 524, 714, 724, 914, 924) of the second coil (30, 310, 320, 510, 520, 710, 720, 910, 920) are joined together with the tip end (313b, 323b, 513b, 523b, 713b, 723b, 913b, 923b) of the radially inner-side lead portion (313, 323, 513, 523, 713, 723, 913, 923) of the first coil (30, 310, 320, 510, 520, 710, 720, 910, 920) facing the one side in the circumferential direction and with the tip end (314a, 324a, 514a, 524a, 714a, 724a, 914a, 924a) of the radially outer-side lead portion (314, 324, 514, 524, 714, 724, 914, 924) of the second coil (30, 310, 320, 510, 520, 710, 720, 910, 920) facing the other side in the circumferential direction. With this configuration, the tip end (313b, 323b, 513b, 523b, 713b, 723b, 913b, 923b) of the radially inner-side lead portion (313, 323, 513, 523, 713, 723, 913, 923), extending toward the one side in the circumferential direction, of the first coil (30, 310, 320, 510, 520, 710, 720, 910, 920) need only be extended toward the same side (the one side in the circumferential direction). This configuration can prevent the radially inner-side lead portion (313, 323, 513, 523, 713, 723, 913, 923) of the first coil (30, 310, 320, 510, 520, 710, 720, 910, 920) from having a complex shape as compared to the case where the tip end (313b, 323b, 513b, 523b, 713b, 723b, 913b, 923b) of the radially inner-side lead portion (313, 323, 513, 523, 713, 723, 913, 923), extending toward the one side in the circumferential direction, of the first coil (30, 310, 320, 510, 520, 710, 720, 910, 920) faces the other side in the circumferential direction.

In the first and second embodiments, as described above, the radially inner-side lead portion (313, 323, 513, 523) has the straight portion (313a, 323a) extending toward the one side in the circumferential direction from the radially inner side toward the radially outer side and the bent portion (313c, 323c) that is continuous with the straight portion (313a, 323a) and that bends the tip end (313b, 323b, 513b, 523b) of the radially inner-side lead portion (313, 323, 513, 523) so that the tip end faces a direction in the circumferential direction. With this configuration, the tip end (313b, 323b, 513b, 523b) of the radially inner-side lead portion (313, 323, 513, 523) is bent by the bent portion (313c, 323c) so as to face a direction in the circumferential direction. This can further prevent the joint portion of the tip end (313b, 323b, 513b, 523b) of the radially inner-side lead portion (313, 323, 513, 523) of the first coil (30, 310, 320, 510, 520) and the tip end (314a, 324a, 514a, 524a) of the radially outer-side lead portion (314, 324, 514, 524) of the second coil (30, 310, 320, 510, 520) from extending into the region outside the radially outer part of the stator core (10) in the direction of the rotation axis.

In the third and fourth embodiments, as described above, the radially inner-side lead portion (713, 723, 913, 923) has the straight portion (713a, 723a, 913a, 923a) extending straight to the tip end (713b, 723b, 913b, 923b) toward the one side in the circumferential direction from the radially inner side toward the radially outer side. This configuration allows the radially inner-side lead portion (713, 723, 913, 923) to have a simple shape and can thus reduce the time required to process the radially inner-side lead portion (713, 723, 913, 923) accordingly. This can improve productivity of the stator (600, 800).

In the third embodiment, as described above, the tip end (713b, 723b) of the straight portion (713a, 723a) of the radially inner-side lead portion (713, 723) has the chamfered portion (713e, 723e) on its radially outer side. With this configuration, the chamfered portion (713e, 723e) can prevent the joint portion of the tip end (713b, 723b) of the radially inner-side lead portion (713, 723) of the first coil (710, 720) and the tip end (714a, 724a) of the radially outer-side lead portion (714, 724) of the second coil (710, 720) from extending into the region outside the radially outer part of the stator core (10) in the direction of the rotation axis, even in the case where the straight portion (713a, 723a) extends to the tip end (713b, 723b) of the radially inner-side lead portion (713, 723).

In the first and third embodiments, as described above, the joining portion (313ba, 323ba, 713ba, 723ba) of the tip end (313b, 323b, 713b, 723b) of the radially inner-side lead portion (313, 323, 713, 723) of the first coil (30, 310, 320, 710, 720) and the joining portion (314aa, 324aa, 714aa, 724aa) of the tip end (314a, 324a, 714a, 724a) of the radially outer-side lead portion (314, 324, 714, 724) of the second coil (30, 310, 320, 710, 720) are joined together in the direction of the rotation axis. This configuration can provide a larger joint area as compared to the case where the tip ends are merely butted and joined. The joint area can be easily adjusted by merely adjusting the amount of overlap between the tip ends as viewed in the direction of the rotation axis.

In the first and third embodiments, as described above, the joining portion (313ba, 323ba, 713ba, 723ba) of the tip end (313b, 323b, 713b, 723b) of the radially inner-side lead portion (313, 323, 713, 723) of the first coil (30, 310, 320, 710, 720) and the joining portion (314aa, 324aa, 714aa, 724aa) of the tip end (314a, 324a, 714a, 724a) of the radially outer-side lead portion (314, 324, 714, 724) of the second coil (30, 310, 320, 710, 720) are joined together in the direction of the rotation axis so that the tip end (314a, 324a, 714a, 724a) of the radially outer-side lead portion (314, 324, 714, 724) of the second coil (30, 310, 320, 710, 720) is located closer to an end face of the stator core (10) in the direction of the rotation axis than the tip end (313b, 323b, 713b, 723b) of the radially inner-side lead portion (313, 323, 713, 723) of the first coil (30, 310, 320, 710, 720) is. This configuration allows the tip ends to be joined together in the direction of the rotation axis while preventing the radially inner-side lead portion (313, 323, 713, 723) of the first coil (30, 310, 320, 710, 720) and the radially outer-side lead portion (314, 324, 714, 724) of the second coil (30, 310, 320, 710, 720) from having a complex shape as compared to the case where the tip end (313b, 323b, 713b, 723b) of the radially inner-side lead portion (313, 323, 713, 723) of the first coil (30, 310, 320, 710, 720) is located closer to an end face of the stator core (10) in the direction of the rotation axis than the tip end (314a, 324a, 714a, 724a) of the radially outer-side lead portion (314, 324, 714, 724) of the second coil (30, 310, 320, 710, 720) is.

In the second and fourth embodiments, as described above, the joining portion (513ba, 523ba, 913ba, 923ba) of the tip end (513b, 523b, 913b, 923b) of the radially inner-side lead portion (513, 523, 913, 923) of the first coil (30, 510, 520, 910, 920) and the joining portion (514aa, 524aa, 914aa, 924aa) of the tip end (514a, 524a, 914a, 924a) of the radially outer-side lead portion (514, 524, 914, 924) of the second coil (30, 510, 520, 910, 920) are joined together in the radial direction. This configuration can provide a larger joint area as compared to the case where the tip ends are merely butted and joined. The joint area can be easily adjusted by merely adjusting the amount of overlap between the tip ends as viewed in the radial direction. Since the tip ends can be joined together from the direction of the rotation axis by, e.g., laser welding etc., joining operation can be facilitated.

In the second and fourth embodiments, as described above, the joining portion (513ba, 523ba, 913ba, 923ba) of the tip end (513b, 523b, 913b, 923b) of the radially inner-side lead portion (513, 523, 913, 923) of the first coil (30, 510, 520, 910, 920) and the joining portion (514aa, 524aa, 914aa, 924aa) of the tip end (514a, 524a, 914a, 924a) of the radially outer-side lead portion (514, 524, 914, 924) of the second coil (30, 510, 520, 910, 920) are joined together in the radial direction so that the tip end (514a, 524a, 914a, 924a) of the radially outer-side lead portion (514, 524, 914, 924) of the second coil (30, 510, 520, 910, 920) is located radially outside the tip end (513b, 523b, 913b, 923b) of the radially inner-side lead portion (513, 523, 913, 923) of the first coil (30, 510, 520, 910, 920). This configuration allows the tip ends to be joined together in the radial direction while preventing the radially inner-side lead portion (513, 523, 913, 923) of the first coil (30, 510, 520, 910, 920) and the radially outer-side lead portion (514, 524, 914, 924) of the second coil (30, 510, 520, 910, 920) from having a complex shape as compared to the case where the tip end (513b, 523b, 913b, 923b) of the radially inner-side lead portion (513, 523, 913, 923) of the first coil (30, 510, 520, 910, 920) is located radially inside the tip end (514a, 524a, 914a, 924a) of the radially outer-side lead portion (514, 524, 914, 924) of the second coil (30, 510, 520, 910, 920).

In the first to fourth embodiments, as described above, the joining portion (314aa, 324aa, 514aa, 524aa, 714aa, 724aa, 914aa, 924aa) of the tip end (314a, 324a, 514a, 524a, 714a, 724a, 914a, 924a) of the radially outer-side lead portion (314, 324, 514, 524, 714, 724, 914, 924) is located near the root portion of the slot (13) at a position shifted radially outward from the exit position (13a) where the radially outer-side lead portion (314, 324, 514, 524, 714, 724, 914, 924) extends out of the slot (13). In the case where the joining portion (314aa, 324aa, 514aa, 524aa, 714aa, 724aa, 914aa, 924aa) of the tip end (314a, 324a, 514a, 524a, 714a, 724a, 914a, 924a) of the radially outer-side lead portion (314, 324, 514, 524, 714, 724, 914, 924) is located at the same radial position as the exit position (13a), there may be other coil(s) (30, 310, 320, 510, 520, 710, 720, 910, 920) disposed below (inside in the direction of the rotation axis) the joining portion (314aa, 324aa, 514aa, 524aa, 714aa, 724aa, 914aa, 924aa) of the tip end (314a, 324a, 514a, 524a, 714a, 724a, 914a, 924a) of the radially outer-side lead portion (314, 324, 514, 524, 714, 724, 914, 924). If there is such other coil(s) (30, 310, 320, 510, 520, 710, 720, 910, 920), it may be difficult to dispose a jig for joining operation etc. below (inside in the direction of the rotation axis) the joining portion (314aa, 324aa, 514aa, 524aa, 714aa, 724aa, 914aa, 924aa) of the tip end (314a, 324a, 514a, 524a, 714a, 724a, 914a, 924a) of the radially outer-side lead portion (314, 324, 514, 524, 714, 724, 914, 924). The above configuration can separate the joining portion (314aa, 324aa, 514*aa*, 524*aa*, 714*aa*, 724*aa*, 914*aa*, 924*aa*) of the tip end (314*a*, 324*a*, 514*a*, 524*a*, 714*a*, 724*a*, 914*a*, 924*a*) of the radially outer-side lead portion (314, 324, 514, 524, 714, 724, 914, 924) from the position where other coil(s) (30, 310, 320, 510, 520, 710, 720, 910, 920) are disposed. This can make enough space for a jig for joining operation etc. available below (inside in the direction of the rotation axis) the joining portion (314*aa*, 324*aa*, 514*aa*, 524*aa*, 714*aa*, 724*aa*, 914*aa*, 924*aa*) of the tip end (314*a*, 324*a*, 514*a*, 524*a*, 714*a*, 724*a*, 914*a*, 924*a*) of the radially outer-side lead portion (314, 324, 514, 524, 714, 724, 914, 924). As a result, the operation of joining the tip ends can be easily and smoothly performed.

In the first and second embodiments, as described above, the first coil (30, 310, 320, 510, 520) and the second coil (30, 310, 320, 510, 520) are formed by winding a rectangular wire, and the joint length (L) of the joining portion (313*ba*, 323*ba*, 513*ba*, 523*ba*) of the tip end (313*b*, 323*b*, 513*b*, 523*b*) of the lead portion (313, 323, 513, 523) of the first coil (30, 310, 320, 510, 520) and the joining portion (314*aa*, 324*aa*, 514*aa*, 524*aa*) of the tip end (314*a*, 324*a*, 514*a*, 524*a*) of the lead portion (314, 324, 514, 524) of the second coil (30, 310, 320, 510, 520) is equal to or larger than the length (W) of the longer side as viewed in cross section of the rectangular wire. This configuration can provide a sufficient joint length (L) of the tip end (313*b*, 323*b*, 513*b*, 523*b*) of the lead portion (313, 323, 513, 523) of the first coil (30, 310, 320, 510, 520) and the tip end (314*a*, 324*a*, 514*a*, 524*a*) of the lead portion (314, 324, 514, 524) of the second coil (30, 310, 320, 510, 520).

In the first to fourth embodiments, as described above, the first coil (30, 310, 320, 510, 520, 710, 720, 910, 920) and the second coil (30, 310, 320, 510, 520, 710, 720, 910, 920) are formed by winding a rectangular wire, and the joining portion (313*ba*, 323*ba*, 513*ba*, 523*ba*, 713*ba*, 723*ba*, 913*ba*, 923*ba*) of the tip end (313*b*, 323*b*, 513*b*, 523*b*, 713*b*, 723*b*, 913*b*, 923*b*) of the lead portion (313, 323, 513, 523, 713, 723, 913, 923) of the first coil (30, 310, 320, 510, 520, 710, 720, 910, 920) and the joining portion (314*aa*, 324*aa*, 514*aa*, 524*aa*, 714*aa*, 724*aa*, 914*aa*, 924*aa*) of the tip end (314*a*, 324*a*, 514*a*, 524*a*, 714*a*, 724*a*, 914*a*, 924*a*) of the lead portion (314, 324, 514, 524, 714, 724, 914, 924) of the second coil (30, 310, 320, 510, 520, 710, 720, 910, 920) are joined together on the shorter side as viewed in cross section of the rectangular wire and the longer side as viewed in cross section of the rectangular wire. This configuration allows the tip end (313*b*, 323*b*, 513*b*, 523*b*, 713*b*, 723*b*, 913*b*, 923*b*) of the lead portion (313, 323, 513, 523, 713, 723, 913, 923) of the first coil (30, 310, 320, 510, 520, 710, 720, 910, 920) and the tip end (314*a*, 324*a*, 514*a*, 524*a*, 714*a*, 724*a*, 914*a*, 924*a*) of the lead portion (314, 324, 514, 524, 714, 724, 914, 924) of the second coil (30, 310, 320, 510, 520, 710, 720, 910, 920) to be joined together without unnecessarily bending the lead portion (313, 323, 513, 523, 713, 723, 913, 923) of the first coil (30, 310, 320, 510, 520, 710, 720, 910, 920) and the lead portion (314, 324, 514, 524, 714, 724, 914, 924) of the second coil (30, 310, 320, 510, 520, 710, 720, 910, 920). The lead portion (313, 323, 513, 523, 713, 723, 913, 923) of the first coil (30, 310, 320, 510, 520, 710, 720, 910, 920) and the lead portion (314, 324, 514, 524, 714, 724, 914, 924) of the second coil (30, 310, 320, 510, 520, 710, 720, 910, 920) can thus be prevented from having a complex shape.

In the first to fourth embodiments, as described above, the joining portion (313*ba*, 323*ba*, 513*ba*, 523*ba*, 713*ba*, 723*ba*, 913*ba*, 923*ba*) of the tip end (313*b*, 323*b*, 513*b*, 523*b*, 713*b*, 723*b*, 913*b*, 923*b*) of the lead portion (313, 323, 513, 523, 713, 723, 913, 923) of the first coil (30, 310, 320, 510, 520, 710, 720, 910, 920) and the joining portion (314*aa*, 324*aa*, 514*aa*, 524*aa*, 714*aa*, 724*aa*, 914*aa*, 924*aa*) of the tip end (314*a*, 324*a*, 514*a*, 524*a*, 714*a*, 724*a*, 914*a*, 924*a*) of the lead portion (314, 324, 514, 524, 714, 724, 914, 924) of the second coil (30, 310, 320, 510, 520, 710, 720, 910, 920) are joined together at a position radially outside the first coil (30, 310, 320, 510, 520, 710, 720, 910, 920) and the second coil (30, 310, 320, 510, 520, 710, 720, 910, 920). This configuration can reliably make enough space available in the region outside the radially outer part of the stator core (10) in the direction of the rotation axis.

In the first to fourth embodiments, as described above, the joining portion (313*ba*, 323*ba*, 513*ba*, 523*ba*, 713*ba*, 723*ba*, 913*ba*, 923*ba*) of the tip end (313*b*, 323*b*, 513*b*, 523*b*, 713*b*, 723*b*, 913*b*, 923*b*) of the lead portion (313, 323, 513, 523, 713, 723, 913, 923) of the first coil (30, 310, 320, 510, 520, 710, 720, 910, 920) and the joining portion (314*aa*, 324*aa*, 514*aa*, 524*aa*, 714*aa*, 724*aa*, 914*aa*, 924*aa*) of the tip end (314*a*, 324*a*, 514*a*, 524*a*, 714*a*, 724*a*, 914*a*, 924*a*) of the lead portion (314, 324, 514, 524, 714, 724, 914, 924) of the second coil (30, 310, 320, 510, 520, 710, 720, 910, 920) are joined together near the root portion of the slot (13). This configuration can more reliably make enough space available in the region outside the radially outer part of the stator core (10) in the direction of the rotation axis.

[Modifications]

The embodiments disclosed herein are merely by way of example in all respects and should not be construed as restrictive.

For example, the first to fourth embodiments are described with respect to an example in which two types of coils with different shapes are used and the tip ends of the two types of coils with different shapes are joined together. However, the present disclosure is not limited to this. In the present disclosure, in the case where two types of coils with different shapes are used, the tip end of the radially inner-side lead portion and the tip end of the radially outer-side lead portion of the coils with the same shape which are disposed in different slots may be joined together. In the present disclosure, a single type of coil may be used or three or more types of coils with different shapes may be used.

The first and third embodiments are described with respect to an example in which the tip ends of the coils which are joined together are joined in the direction of the rotation axis, and the second and fourth embodiments are described with respect to an example in which the tip ends of the coils which are joined together are joined in the radial direction. However, the present disclosure is not limited to this. For example, the tip ends of the coils which are joined together may be joined in the circumferential direction. That is, the tip ends of the coils which are joined together may be butted against each other so as to face opposite directions in the circumferential direction and be joined together.

The first and third embodiments are described with respect to an example in which the joining portion of the tip end of the radially inner-side lead portion and the joining portion of the tip end of the radially outer-side lead portion are joined together in the direction of the rotation axis so that the tip end of the radially outer-side lead portion is located closer to an end face of the stator core in the direction of the rotation axis than the tip end of the radially inner-side lead portion is. However, the present disclosure is not limited to this. For example, the joining portion of the tip end of the radially inner-side lead portion and the joining portion of the tip end of the radially outer-side lead portion may be joined together in the direction of the rotation axis so that the tip end of the radially inner-side lead portion is located closer to the end face of the stator core in the direction of the rotation axis than the tip end of the radially outer-side lead portion is.

The second and fourth embodiments are described with respect to an example in which the joining portion of the tip end of the radially inner-side lead portion and the joining portion of the tip end of the radially outer-side lead portion are joined together in the radial direction so that the tip end of the radially outer-side lead portion is located radially outside the tip end of the radially inner-side lead portion. However, the present disclosure is not limited to this. In the present disclosure, the joining portion of the tip end of the radially inner-side lead portion and the joining portion of the tip end of the radially outer-side lead portion may be joined together in the radial direction so that the tip end of the radially inner-side lead portion is located radially outside the tip end of the radially outer-side lead portion.

The first and second embodiments are described with respect to an example in which the joint length of the joining portions of the tip ends of the lead portions which are joined together is equal to or larger than the length of the longer side as viewed in cross section of the rectangular wire. However, the present disclosure is not limited to this. In the present disclosure, the joint length of the joining portions of the tip ends of the lead portions which are joined together may be smaller than the length of the longer side as viewed in cross section of the rectangular wire as long as a sufficient joint length is provided.

The first to fourth embodiments are described with respect to an example in which the joining portions of the tip ends of the lead portions which are joined together are joined together on the shorter side as viewed in cross section of the rectangular wire and the longer side as viewed in cross section of the rectangular wire. However, the present disclosure is not limited to this. In the present disclosure, the joining portions of the tip ends of the lead portions which are joined together may be joined together on the shorter sides as viewed in cross section of the rectangular wire or may be joined together on the longer sides as viewed in cross section of the rectangular wire.

The third embodiment is described with respect to an example in which the tip end of the straight portion of the radially inner-side lead portion has a chamfered portion on its radially outer side. However, the present disclosure is not limited thereto. In the present disclosure, the tip end of the straight portion of the radially inner-side lead portion need not necessarily have a chamfered portion on its radially outer side.

The invention claimed is:

1. A stator, comprising:
a stator core having a plurality of slots;
a first coil that is disposed in a first slot of the plurality of slots; and
a second coil that is disposed in a second slot of the plurality of slots that is different from the first slot in which the first coil is disposed, wherein
a tip end of a lead of the first coil faces one side in a circumferential direction at a coil end,
a tip end of a lead of the second coil faces the other side in the circumferential direction at the coil end,
the tip end of the lead, extending toward the one side in the circumferential direction, of the first coil and the tip end of the lead, extending toward the other side in the circumferential direction, of the second coil are joined together, and
the tip end of the lead of the first coil and the tip end of the lead of the second coil are located radially outside a root of the first slot and radially inside a radially outermost part of the stator core as viewed in a direction of a rotation axis.

2. The stator according to claim 1, wherein
the lead of the first coil first extends in the direction of the rotation axis at a position on a radially inner side of the first slot and then extends toward the one side in the circumferential direction from a radially inner side toward a radially outer side, and
the lead of the second coil first extends in the direction of the rotation axis at a position on a radially outer side of the second slot and then extends toward the other side in the circumferential direction at a position near the coil end.

3. The stator according to claim 2, wherein
the lead of the second coil first extends in the direction of the rotation axis at the position on the radially outer side of the second slot and then extends toward the other side in the circumferential direction at a position lower than the coil end in the direction of the rotation axis.

4. The stator according to claim 1, wherein
the entire lead of the first coil and the entire lead of the second coil are located radially inside a position shifted radially outward from the root of the slot by an amount corresponding to a single wire forming the first coil or the second coil, as viewed in the direction of the rotation axis.

5. The stator according to claim 1, wherein
both the first coil and the second coil have a radially inner-side lead extending from the radially inner side toward the radially outer side and a radially outer-side lead located on the radially outer side, and
the tip end of the radially inner-side lead of the first coil and of the tip end of the radially outer-side lead of the second coil are joined together.

6. The stator according to claim 5, wherein
the radially inner-side lead extends toward the one side in the circumferential direction from the radially inner side toward the radially outer side, and
tip end of the radially inner-side lead of the first coil and the tip end of the radially outer-side lead of the second coil are joined together with the tip end of the radially inner-side lead of the first coil facing the one side in the circumferential direction and with the tip end of the radially outer-side lead of the second coil facing the other side in the circumferential direction.

7. The stator according to claim 6, wherein
the radially inner-side lead has a first portion that is straight extending toward the one side in the circumferential direction from the radially inner side toward the radially outer side and a second portion that is bent that is continuous with the first portion and that bends the tip end of the radially inner-side lead so that the tip end of the radially inner-side lead faces a direction in the circumferential direction.

8. The stator according to claim 6, wherein
the radially inner-side lead has a first portion extending straight to the tip end toward the one side in the circumferential direction from the radially inner side toward the radially outer side.

9. The stator according to claim 8, wherein
the tip end of the first portion of the radially inner-side lead has a portion that is chamfered on a radially outer side.

10. The stator according to claim 5, wherein the tip end of the radially inner-side lead of the first coil and the tip end of the radially outer-side lead of the second coil are joined together in the direction of the rotation axis.

11. The stator according to claim 10, wherein the tip end of the radially inner-side lead of the first coil and the tip end of the radially outer-side lead of the second coil are joined together in the direction of the rotation axis so that the tip end of the radially outer-side lead of the second coil is located closer to an end face of the stator core in the direction of the rotation axis than the tip end of the radially inner-side lead of the first coil.

12. The stator according to claim 5, wherein the tip end of the radially inner-side lead of the first coil and the tip end of the radially outer-side lead of the second coil are joined together in a radial direction.

13. The stator according to claim 12, wherein the tip end of the radially inner-side lead of the first coil and the tip end of the radially outer-side lead of the second coil are joined together in the radial direction so that the tip end of the radially outer-side lead of the second coil is located radially outside the tip end of the radially inner-side lead of the first coil.

14. The stator according to claim 5, wherein the tip end of the radially outer-side lead is located near the root of the first slot at a position shifted radially outward from an exit position where the radially outer-side lead extends out of the first slot.

15. The stator according to claim 1, wherein the first coil and the second coil are formed by winding a rectangular wire, and a joint length of the tip end of the lead of the first coil and the tip end of the lead of the second coil is equal to or larger than a length of a longer side as viewed in cross section of the rectangular wire.

16. The stator according to claim 1, wherein the first coil and the second coil are formed by winding a rectangular wire, and the tip end of the lead of the first coil and the tip end of the lead of the second coil are joined together on a shorter side as viewed in cross section of the rectangular wire and the longer side as viewed in cross section of the rectangular wire.

17. The stator according to claim 1, wherein the tip end of the lead of the first coil and the tip end of the lead of the second coil are joined together at a position radially outside the first coil and the second coil.

18. The stator according to claim 17, wherein the tip end of the lead of the first coil and the tip end of the lead of the second coil are joined together near the root portion of the slot.

* * * * *